(12) United States Patent
Wang et al.

(10) Patent No.: US 10,855,969 B2
(45) Date of Patent: Dec. 1, 2020

(54) FILE PROCESSING METHOD, TERMINAL, SERVER, AND COMPUTER STORAGE MEDIUM

(71) Applicant: TENCENT TECHNOLOGY (SHENZHEN) COMPANY LIMITED, Shenzhen (CN)

(72) Inventors: Tong Wang, Shenzhen (CN); Gu Cai Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/297,900

(22) Filed: Mar. 11, 2019

(65) Prior Publication Data

US 2019/0208178 A1  Jul. 4, 2019

Related U.S. Application Data

(63) Continuation of application No. PCT/CN2017/110949, filed on Nov. 14, 2017.

(30) Foreign Application Priority Data

Nov. 16, 2016 (CN) .......................... 2016 1 1009068

(51) Int. Cl.
*H04N 13/00* (2018.01)
*H04N 13/189* (2018.01)
(Continued)

(52) U.S. Cl.
CPC ......... *H04N 13/189* (2018.05); *G06F 16/176* (2019.01); *G06F 16/71* (2019.01);
(Continued)

(58) Field of Classification Search
CPC ............................... G06F 16/176; G06F 16/71
(Continued)

(56) References Cited

U.S. PATENT DOCUMENTS 10,067,349 B2 * 9/2018 Chen .................... G02B 27/017
2015/0168723 A1  6/2015 Eto et al.
(Continued)

FOREIGN PATENT DOCUMENTS

CN    101808250 A    8/2010
CN    103533305 A    1/2014
(Continued)

OTHER PUBLICATIONS

Reddy, S., Rao, S. & Hedge, R. M. (Mar. 2016). "On the development of a dynamic virtual reality system using audio and visual scenes" Twenty Second National Conference on Communication. (Year: 2016).*

(Continued)

*Primary Examiner* — Thai Q Tran
*Assistant Examiner* — Stephen R Smith
(74) *Attorney, Agent, or Firm* — Sughrue Mion, PLLC

(57) ABSTRACT

A file processing method is provided. A file conversion logic based on a player plug-in, a software development kit (SDK), and a recording plug-in that are loaded and run in a designated three-dimensional (3D) operation environment is obtained. A first to-be-processed file and a second to-be-processed file obtained based on a source file are played. Audio/video decoding is performed on each of the first to-be-processed file and the second to-be-processed file based on the file conversion logic. Distortion processing is performed on a result of the audio/video decoding, and a result of the distortion processing is stored in an image file format in a video random access memory (RAM).

17 Claims, 11 Drawing Sheets

(51) Int. Cl.
  *G06F 16/71*     (2019.01)
  *H04N 13/161*    (2018.01)
  *H04N 13/139*    (2018.01)
  *G06F 16/176*    (2019.01)
  *H04N 13/344*    (2018.01)
  *H04N 21/4782*   (2011.01)
  *H04N 13/122*    (2018.01)
  *H04N 21/433*    (2011.01)
  *H04N 21/414*    (2011.01)
  *H04N 21/233*    (2011.01)
  *H04N 21/81*     (2011.01)
  *H04N 21/2343*   (2011.01)

(52) U.S. Cl.
  CPC ......... *H04N 13/122* (2018.05); *H04N 13/139* (2018.05); *H04N 13/161* (2018.05); *H04N 13/344* (2018.05); *H04N 21/233* (2013.01); *H04N 21/2343* (2013.01); *H04N 21/414* (2013.01); *H04N 21/433* (2013.01); *H04N 21/4782* (2013.01); *H04N 21/81* (2013.01)

(58) Field of Classification Search
  USPC .............................. 348/42, 51; 345/156, 419
  See application file for complete search history.

(56) References Cited

U.S. PATENT DOCUMENTS

| | | | |
|---|---|---|---|
| 2016/0101356 A1 | 4/2016 | Kuo et al. | |
| 2016/0203646 A1* | 7/2016 | Nadler | H04N 13/344 345/419 |
| 2016/0212482 A1* | 7/2016 | Balko | H04N 21/440218 |
| 2017/0078447 A1* | 3/2017 | Hancock | H04N 21/4402 |
| 2017/0150122 A1* | 5/2017 | Cole | H04N 13/243 |
| 2017/0206708 A1* | 7/2017 | Gentilin | G06T 19/006 |
| 2017/0257621 A1* | 9/2017 | Kato | H04N 13/344 |
| 2018/0020204 A1* | 1/2018 | Pang | H04N 19/42 |
| 2018/0025478 A1* | 1/2018 | Lee | G06T 5/50 382/284 |
| 2018/0053284 A1* | 2/2018 | Rodriguez | G06T 5/006 |
| 2018/0096519 A1* | 4/2018 | Tokubo | G06F 3/011 |
| 2019/0080517 A1* | 3/2019 | You | G02B 27/0172 |
| 2019/0215505 A1* | 7/2019 | Ishii | H04N 13/156 |

FOREIGN PATENT DOCUMENTS

| | | |
|---|---|---|
| CN | 205071176 U | 3/2016 |
| CN | 105872521 A | 8/2016 |
| CN | 105892643 A | 8/2016 |
| WO | 2013/082387 A1 | 6/2013 |

OTHER PUBLICATIONS

International Search Report of PCT/CN2017/110949 dated Feb. 6, 2018 [PCT/ISA/210].

Written Opinion of the International Searching Authority for PCT/CN2017/110949 dated Feb. 6, 2018.

Communication dated Sep. 29, 2019 from the China National Intellectual Property Administration in counterpart Application No. 201611009068.1.

* cited by examiner

101 — Obtain a file conversion logic, the file conversion logic being a logic generated on a server side based on a player plug-in, a software development kit (SDK), and a recording plug-in that are loaded and run in a designated 3D operation environment 102 — Play a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal 103 — Perform audio/video decoding on each of the first to-be-processed file and the second to-be-processed file based on the file conversion logic, to obtain an audio file and an image file that correspond to each of the first to-be-processed file and the second to-be-processed file 104 — Perform distortion processing on the image file corresponding to each of the first to-be-processed file and the second to-be-processed file, and store an obtained result of the distortion processing in an image file format to an video RAM to perform file sharing 105 — Receive a recording operation, and when providing the result of the distortion processing to a recording thread for recording, encode and combine, based on the file conversion logic, the result of the distortion processing and the audio file that corresponds to each of the first to-be-processed file and the second to-be-processed file into a first target file and a second target file that are directly used for VR playing

FIG. 4

FILE PROCESSING METHOD, TERMINAL, SERVER, AND COMPUTER STORAGE MEDIUM

CROSS-REFERENCE TO RELATED APPLICATION(S)

This application is a continuation of International Application No. PCT/CN2017/110949, filed on Nov. 14, 2017, in the Chinese Patent Office, which claims priority from Chinese Patent Application No. 201611009068.1, filed on Nov. 16, 2016, which is incorporated by reference in its entirety.

BACKGROUND

1. Field

The disclosure relates to conversion technologies, and in particular, to a method, a terminal, a server, and a computer storage medium for processing a file.

2. Description of the Related Art

As man-machine interaction technologies develop and intelligent terminals become increasingly popular, various information transmission and exchange manners are introduced. In an information transmission and exchange scenario based on virtual reality (VR), VR glasses are commonly used. The VR glasses not only support a panoramic image but also support a three-dimensional (3D) image. However, to support playback of a 3D video, a specified application (APP) needs to be installed for processing. This causes additional processing costs and low processing efficiency. Moreover, this method is inconvenient, and a file format obtained after the processing does not support playback of a 3D video on a web page, leading to a very limited application range. When an image file obtained after the processing is combined with the VR glasses, a 3D effect is achieved only by projecting a distorted image file on the glasses. That is, a main reason that the distorted image file cannot be normally viewed by directly using the VR glasses is due to a limited application range of the file format. However, in the related art, there is no effective solution for these problems.

SUMMARY

In view of this, embodiments provide a file processing method, a terminal and a server, and a computer storage medium, to resolve at least problems that exist in the related art technology.

According to an aspect of an exemplary embodiment, provided is a file processing method in a terminal including at least one processor. A file conversion logic is obtained, the file conversion logic being based on a player plug-in, a software development kit (SDK), and a recording plug-in that are loaded and run in a designated three-dimensional (3D) operation environment. A first to-be-processed file and a second to-be-processed file obtained based on a source file are played, the first to-be-processed file being a left video file of the source file displayed on a screen of the terminal, and the second to-be-processed file being a right video file of the source file displayed on the screen of the terminal. Audio/video decoding is performed on each of the first to-be-processed file and the second to-be-processed file based on the file conversion logic, to obtain a first audio file and a first image file that correspond to the first to-be-processed file and to obtain a second audio file and a second image file that correspond to the second to-be-processed file. Distortion processing is performed on the first image file and the second image file, and storing a result of the distortion processing in an image file format in a video random access memory (RAM).

According to an aspect of another exemplary embodiment, provided is a terminal, including: at least one memory operable to store program code; and at least one processor operable to read the program code and operate as instructed by the program code, the program code including: obtaining code configured to cause the at least one processor to obtain a file conversion logic, the file conversion logic being a logic based on a player plug-in, a software development kit (SDK), and a recording plug-in that are loaded and run in a designated three-dimensional (3D) operation environment; playing code configured to cause the at least one processor to play a first to-be-processed file and a second to-be-processed file obtained based on a source file, the first to-be-processed file being a left video file of the source file displayed on a screen of the terminal, and the second to-be-processed file being a right video file of the source file displayed on the screen of the terminal; and first processing code configured to cause the at least one processor to: perform audio/video decoding on each of the first to-be-processed file and the second to-be-processed file based on the file conversion logic, to obtain a first audio file and a first image file that correspond to the first to-be-processed file and to obtain a second audio file and a second image file that correspond to the second to-be-processed file, perform distortion processing on the first image file and the second image file, and store a result of the distortion processing in an image file format in a video random access memory (RAM).

According to an aspect of still another exemplary embodiment, provided is a non-transitory computer storage medium storing instructions, which, when executed by at least one processor, cause the at least one processor to perform: obtaining a file conversion logic, the file conversion logic being based on a player plug-in, a software development kit (SDK), and a recording plug-in that are loaded and run in a designated three-dimensional (3D) operation environment; playing a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal; performing audio/video decoding on each of the first to-be-processed file and the second to-be-processed file based on the file conversion logic, to obtain a first audio file and a first image file that correspond to the first to-be-processed file and to obtain a second audio file and a second image file that correspond to the second to-be-processed file; and performing distortion processing on the first image file and the second image file, and storing a result of the distortion processing in an image file format in a video random access memory (RAM).

According to the embodiments of the present invention, on one hand, a file conversion logic is used as a general processing mechanism, so that a series of operations such as audio/video decoding and distortion processing may be performed. Therefore, any source file and terminal may be adaptive to, and no specified APP needs to be installed on the terminal for processing. In addition, the processing is aimed for a first to-be-processed file and a second to-be-processed file obtained based on a source file, the first to-be-processed file is a left video file of the source file displayed on a screen of the terminal, and the second to-be-processed file is a right video file of the source file displayed on the screen of the terminal. That is, the processing is performed on the left/right format of the source file. In this way, a better distortion processing effect is achieved, and unlike the related art technology, there is no need to subsequently separately project results of the source file on VR for playing. On the other hand, the obtained result of the distortion processing is stored in an image file format to a video RAM for performing file sharing, so that there is no need to perform a plurality of times of copy operations, and a required file only needs to be obtained from sharing during recording, not only improving efficiency, but also preventing excessive occupancy of a CPU and a memory. After an instruction for a recording operation is received, the result of the distortion processing is provided to a recording thread for recording, and finally the result of the distortion processing and the audio file are encoded and combined into a first target file and a second target file that are directly used for VR playing.

BRIEF DESCRIPTION OF THE DRAWINGS

The above and/or other aspects will become apparent and more readily appreciated by describing certain exemplary embodiments with reference to the accompanying drawings, in which:

FIG. 4 is a schematic diagram of a method implementation procedure according to an embodiment;

DETAILED DESCRIPTION

Figure 1:
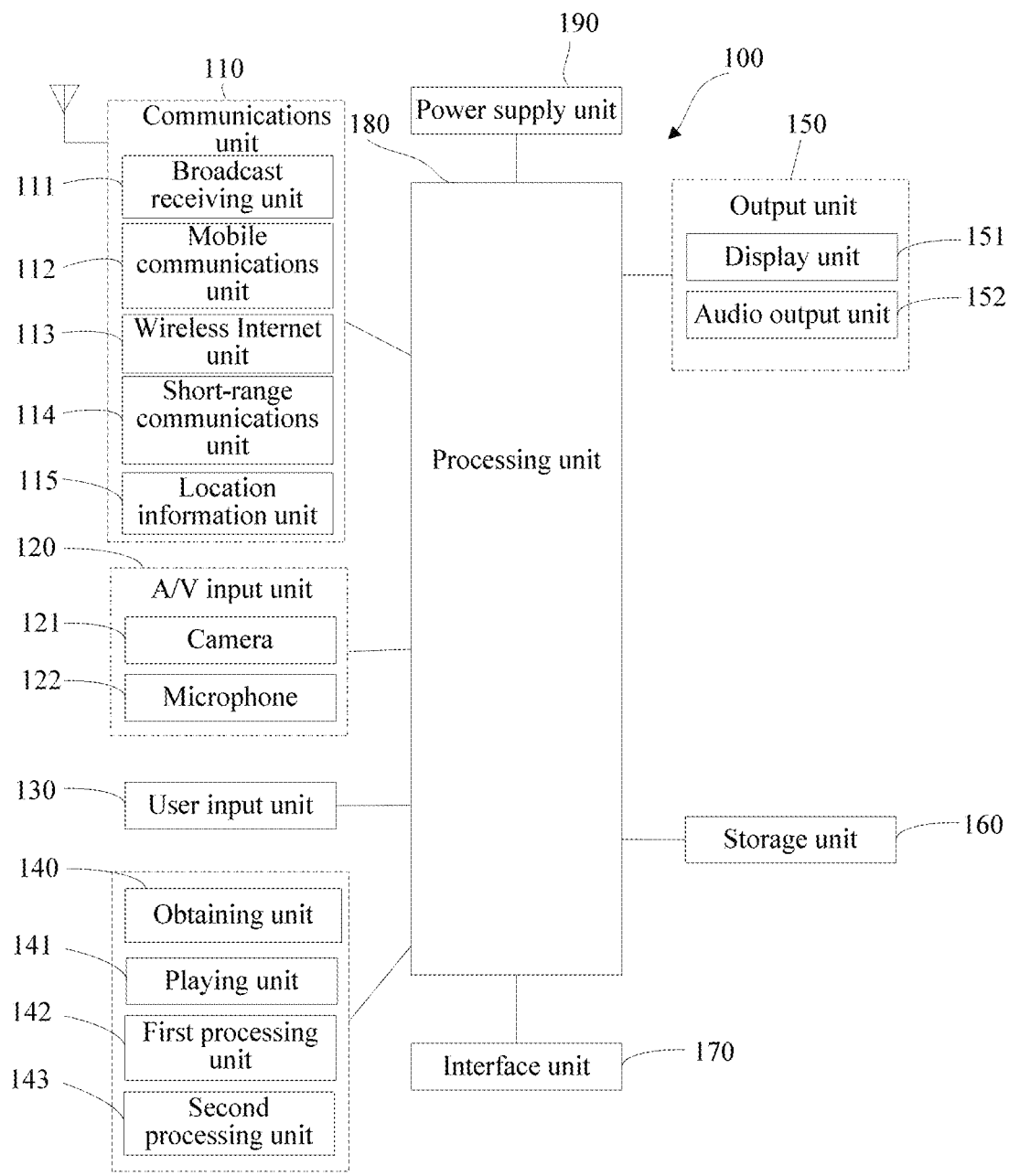
FIG. 1 is an optional schematic structural diagram of hardware of a mobile terminal for implementing embodiments.

The following further describes the implementations of the technical solutions in detail with reference to the accompany drawings.

Mobile terminals used for implementing embodiments are currently described with reference to the accompanying drawings. In subsequent descriptions, suffixes such as "module", "component", or "unit" that are used to represent elements are merely conducive to the descriptions of the embodiments, and have no specific meanings themselves. It will be understood that, the terms, such as "unit," "module," "component," "part," etc., should be understood as a unit that performs at least one function or operation and that may be embodied as hardware, software, or a combination thereof.

A plurality of details is described in the following detailed descriptions for thorough understanding of the disclosure. However, for persons of ordinary skill in the art, the disclosure may obviously be implemented without these details. In other cases, a disclosed well-known method, process, assembly, circuit, and network are not described in detail, to not to unnecessarily obscure the aspects of the embodiments.

In addition, in this specification, although elements (or thresholds or applications or instructions or operations) are described by using terms such as "first" and "second" for a plurality of times, the elements (or thresholds or applications or instructions or operations) should not be limited by these terms. These terms are merely used to distinguish between an element (or thresholds or applications or instructions or operations) and another element (or thresholds or applications or instructions or operations). For example, a first operation may be referred to as a second operation, and the second operation may also be referred to as the first operation.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The steps in the embodiments may not be performed in the described sequence of steps, and the steps may be intermingled and rearranged based on demand, or the steps in the embodiments may be eliminated, or the steps in the embodiments may be increased. The descriptions of the steps in the embodiments are only optional sequence combination, and do not represent all sequence combinations of the embodiments. The steps sequence in the embodiments should not be considered as a limitation to the present invention.

The term "and/or" in the embodiments refer to any one or more possible combinations of the listed items related to each other. It should be further noted that: when being used in the specification, "including/including" specifies existence of the described feature, integer, step, operation, element and/or component. However, existence or increase of one or more other features, integers, steps, operations, elements and/or components and/or combinations thereof is not excluded.

Intelligent terminals (for example, the mobile terminal) of the embodiments may be implemented in various forms. For example, the mobile terminal described in the embodiments may include a mobile terminal such as a mobile phone, a smartphone, a laptop computer, a digital broadcast receiver, a personal digital assistant (PDA), a tablet computer (PAD), a portable media player (PMP), and a navigation apparatus and a fixed terminal such as a digital TV and a desktop computer. In the following descriptions, it is assumed that the terminal is a mobile terminal. However, persons skilled in the art understand that, in addition to elements specified for movement, structures based on implementations of the disclosure is also applicable to a terminal of a fixed type.

FIG. 1 is an optional schematic structural diagram of hardware of a mobile terminal for implementing exemplary embodiments.

The mobile terminal 100 may include a communications unit 110, an audio/video (A/V) input unit 120, a user input unit 130, an obtaining unit 140, a playing unit 141, a first processing unit 142, a second processing unit 143, an output unit 150, a storage unit 160, an interface unit 170, a processing unit 180, a power supply unit 190, and the like. FIG. 1 shows the mobile terminal having various assemblies. However, it should be understood that, not all of the shown assemblies need to be implemented. More or fewer assemblies may alternatively be implemented. The elements of the mobile terminal are described in detail below.

The communications unit 110 normally includes one or more assemblies, and the communications unit 110 allows the mobile terminal 100 to perform radio communication with a wireless communications system or a network (if the mobile terminal is replaced with the fixed terminal, electrical communication may be performed in a wired manner). For example, in the case of the communications unit 110 being a wireless communications unit, the communications unit 110 may include at least one of a broadcast receiving unit 111, a mobile communications unit 112, a wireless Internet unit 113, a short range communications unit 114, and a location information unit 115. These units are optional, and may be added or deleted based on different demands.

The broadcast receiving unit 111 receives a broadcast signal and/or broadcast related information from an external broadcast management server by using a broadcast channel. The broadcast channel may include a satellite channel and/or a terrestrial channel. The broadcast management server may be a server that generates and sends a broadcast signal and/or broadcast related information or a server that receives and sends a previously-generated broadcast signal and/or broadcast related information to the terminal. The broadcast signal may include a TV broadcast signal, a radio broadcast signal, a data broadcast signal, and the like. In addition, the broadcast signal may further include a broadcast signal combined with the TV or radio broadcast signal. The broadcast related information may also be provided by using a mobile telecommunications network, and in that case, the broadcast related information may be received by the mobile communications unit 112. The broadcast signal may exist in various forms. For example, the broadcast signal may exist in forms such as an electronic program guide (EPG) of Digital Multimedia Broadcasting (DMB) and an electronic service guide (ESG) of Digital Video Broadcasting-Handheld (DVB-H). The broadcast receiving unit 111 may receive signal broadcast by using various types of broadcasting systems. Particularly, the broadcast receiving unit 111 may receive digital broadcast by using digital broadcasting systems such as Digital Multimedia Broadcasting-Terrestrial (DMB-T), Digital Multimedia Broadcasting-Satellite (DMB-S), DVB-H, a digital broadcasting system of Media Forward Link Only (MediaFLO), and Integrated Services Digital Broadcasting-Terrestrial (ISDB-T). The broadcast receiving unit 111 may be various broadcasting systems and the foregoing digital broadcasting systems that are suitable for providing a broadcast signal. A broadcast signal and/or broadcast related information received by the broadcast receiving unit 111 may be stored in the memory 160 (or a storage medium of another type).

The mobile communications unit 112 sends a radio signal to at least a base station (for example, an access point and a NodeB), an external terminal, and a server and/or receives a radio signal from the base station, the external terminal, and the server. Such a radio signal may include a voice conversation signal, a video conversation signal, or various types of data sent and/or received based on text and/or a multimedia message.

The wireless Internet unit 113 supports wireless Internet access of the mobile terminal. The unit may be internally or externally coupled to the terminal. A wireless Internet access technology related to the unit may include Wireless Local Area Networks (Wi-Fi, WLAN), wireless broadband (Wibro), Worldwide Interoperability for Microwave Access (Wimax), High Speed Downlink Packet Access (HSDPA), and the like.

The short range communications unit 114 is a unit configured to support short range communication. Some examples of a short range communication technology include Bluetooth, Radio Frequency Identification (RFID), Infrared Data Association (IrDA), Ultra Wideband (UWB), ZigBee, and the like.

The location information unit 115 is a unit configured to check or obtain location information of the mobile terminal. A typical example of the location information unit is a global positioning system (GPS). Based on a current technology, the location information unit 115 calculates distance information from three or more satellites and accurate time information, and applies a triangle measurement method to the calculated information, to precisely calculate current three-dimensional location information based on longitude, latitude, and heights. At present, a method used for calculating location and time information uses three satellites and corrects an error of the calculated location and time information by using another satellite. In addition, the location information unit 115 can calculate speed information by constantly calculating current location information in real time.

The A/V input unit 120 is configured to receive an audio or a video signal. The A/V input unit 120 may include a camera 121 and a microphone 122. The camera 121 processes image data that is of a static image or a video and that is obtained by an image capturing apparatus in a video capturing mode or an image capturing mode. An image frame obtained after the processing may be displayed on the display unit 151. The image frame processed by the camera 121 may be stored in the storage unit 160 (or another storage medium) or sent by the communications unit 110, and two or more cameras 121 may be provided based on the structure of the mobile terminal. The microphone 122 may receive voice (audio data) in an operating mode such as a phone call mode, recording mode, and speech recognition mode by using the microphone, and can process such voice into audio data. The processed audio (speech) data may be output by being converted in a format in which the data is sent in a phone call mode by the mobile communications unit 112 to a mobile communications base station. The microphone 122 may implement various types of noise elimination (or suppression) algorithms to eliminate (or suppress) noise or interference generated in an audio signal receiving and sending process.

The user input unit 130 may input data based on a command entered by a user, to control various operations of the mobile terminal. The user input unit 130 allows the user to enter various types of information, and may include a keyboard, a mouse, a touch panel (for example, a touch-sensitive assembly configured to detect changes such as resistance, pressure, and capacitance that are caused due to contact), a mouse wheel, a joystick, and the like. Particularly, when the touch panel is stacked on the display unit 151, a touchscreen is formed.

The obtaining unit 140 is configured to obtain a file conversion logic. The playing unit 141 is configured to play a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal. The first processing unit 142 is configured to:

perform audio/video decoding on each of the first to-be-processed file and the second to-be-processed file based on the file conversion logic, to obtain an audio file and an image file that correspond to each of the first to-be-processed file and the second to-be-processed file, perform distortion processing on the image file corresponding to each of the first to-be-processed file and the second to-be-processed file, and store an obtained result of the distortion processing in an image file format in a video RAM to perform file sharing. The second processing unit 143 is configured to: receive an instruction for a recording operation, and when providing the result of the distortion processing to a recording thread for recording, encode and combine, based on the file conversion logic, the result of the distortion processing and the audio file that corresponds to each of the first to-be-processed file and the second to-be-processed file into a first target file and a second target file that are directly used for VR playing.

The interface unit 170 is used as an interface that can be passed through by at least one external apparatus connected to the mobile terminal 100. For example, the external apparatus may include a wired or wireless headphone port, an external power supply (or a battery charger) port, a wired or wireless data port, a memory card port, a port configured to connect an apparatus having an identification unit, an audio output/input (I/O) port, a video I/O port, an earphone port, and the like. The identification unit may store various information used for verifying use of the mobile terminal 100 by a user and may include a user identify module (UIM), a subscriber identity module (SIM), a universal subscriber identity module (USIM), and the like. In addition, the apparatus having the identification unit (referred to as an "identification apparatus") may be in a form of a smartcard. Therefore, the identification apparatus may be connected to the mobile terminal 100 by using a port or another connection apparatus. The interface unit 170 may be configured to receive an input from the external apparatus (for example, data information and electricity), and transmit the received input to one or more elements in the mobile terminal 100, or may be configured to transmit data between the mobile terminal 100 and the external apparatus.

In addition, when the mobile terminal 100 is connected to an external dock, the interface unit 170 may be used as a path that allows to provide electricity from the dock to the mobile terminal 100 by using the interface unit 170 or may be used as a path that allows various command signals that are input from the dock to be transmitted to the mobile terminal by using the interface unit 170. The various command signals that are input from the dock or the electricity may be used as a signal used to identify whether the mobile terminal is accurately installed on the dock. The output unit 150 is configured to output a signal (for example, an audio signal, a video signal, or a vibration signal) in a visual, audio, and/or touch manner. The output unit 150 may include the display unit 151, an audio output unit 152, and the like.

The display unit 151 may display information processed in the mobile terminal 100. For example, the mobile terminal 100 may display a related user interface (UI or a graphical user interface (GUI). When the mobile terminal 100 is in a video call mode or an image capturing mode, the display unit 151 may display a captured image and/or a received image, show a video or image and a UI or GUI of a related function, or the like.

In addition, when the display unit 151 and the touch panel are stacked in a form of layers to form a touchscreen, the display unit 151 may be used as an input device and an output device. The display unit 151 may include at least one of a liquid crystal display (LCD), a thin film transistor-LCD (TFT-LCD), an organic light-emitting diode (OLED) display, a flexible display, a three-dimensional (3D) display, and the like. Some of the displays are provided in a transparent state to allow the user to view from the outside, and may be referred to as transparent displays. Typical transparent displays may be, for example, a transparent organic light-emitting diode (TOLED) display. According to a specified and desired implementation, the mobile terminal 100 may include two or more display units (or another display apparatus). For example, the mobile terminal may include an external display unit (not shown) and an internal display unit (not shown). The touchscreen may be configured to detect a touch input pressure, a touch input position, and a touch input area.

The audio output unit 152 may, when the mobile terminal is in a mode such as a call signal receiving mode, a calling mode, a recording mode, a speech recognition mode, a broadcast receiving mode, convert audio data that is received by the communications unit 110 or is stored in the memory 160 into an audio signal and output as sound. In addition, the audio output unit 152 may provide an audio output (for example, a call signal receiving sound and a message receiving sound) related to a specific function executed by the mobile terminal 100. The audio output unit 152 may include a speaker, a buzzer, and the like.

The storage unit 160 may store a software program executed by the processing unit 180 for processing and controlling operations, and the like. Alternatively, the storage unit 160 may temperately store data that is already output or that is to be output (for example, a personal address book, a message, a still image, and a video). In addition, the storage unit 160 may store data that is related to vibrations of various manners and audio signals that are output when a touch is performed on a touchscreen.

The storage unit 160 may include at least one type of storage medium, and the storage medium includes a flash memory, a hard disk, a multimedia card, a card memory (for example, an SD or DX memory), a random access memory (RAM), a static random access memory (SRAM), a read only memory (ROM), an electrically erasable programmable read only memory (EEPROM), a programmable read only memory (PROM), a magnetic memory, a magnetic disk, an optical disc, and the like. In addition, the mobile terminal 100 may be engaged with a network storage apparatus that executes a storage function of the storage unit 160 by using network connection The processing unit 180 normally controls an overall operation of the mobile terminal. For example, the processing unit 180 performs controlling and processing that are related to voice call, data communication, video call and the like. For another example, the processing unit 180 may perform mode identifying processing, to identify a handwriting input or an image drawing input that are performed on a touchscreen as a character or an image.

The interface unit 190 receives external electricity or internal electricity under control of the processing unit 180 and provides appropriate electricity required for operating the elements and assemblies.

The various implementations described herein may be implemented by using, for example, a computer-readable medium of computer software, hardware or any combination therefore. For hardware implementation, the implementations described herein may be implemented by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to implement functions described herein. In some cases, such implementations may be implemented in the processing unit 180. For software implementation, for example, implementations of process or functions may be performed by a single software unit that is allowed to perform at least one function or operation. Software code may be implemented by a software application (or a program) written in any appropriate programming language, and the software code may be stored in the storage unit 160 and executed by the processing unit 180. A specific hardware entity of the storage unit 160 may be a memory, and a specific hardware entity of the processing unit 180 may be a controller.

Here, the mobile terminal has been described based on functions of the mobile terminal. In the following descriptions, for brevity, a slide-type mobile terminal of mobile terminals of various types such as fordable-type, bar-type, swing-type, and slide-type is used as an example for description. Therefore, the disclosure can be applied to any type of mobile terminal and is not limited to the slide-type mobile terminal.

The mobile terminal 100 shown in FIG. 1 may be configured to be operated by a wired and wireless communications system that send data by using a frame or a group and a communications system based on a satellite.

A communications system that can be operated by the mobile terminal according to the embodiment is described with reference to FIG. 2.

The communications system herein may use different air interfaces and/or physical layers. For example, the air interfaces used in the communications system includes, for example, Frequency Division Multiple Access (FDMA), Time Division Multiple Access (TDMA), Code Division Multiple Access (CDMA) and Universal Mobile Telecommunications System (UMTS) (particularly, Long Term Evolution (LTE)), Global System for Mobile Communications (GSM). As a non-limitative example, the following descriptions relate to a CDMA communications system. However, such description is also applicable to a system of another type.

Figure 2:
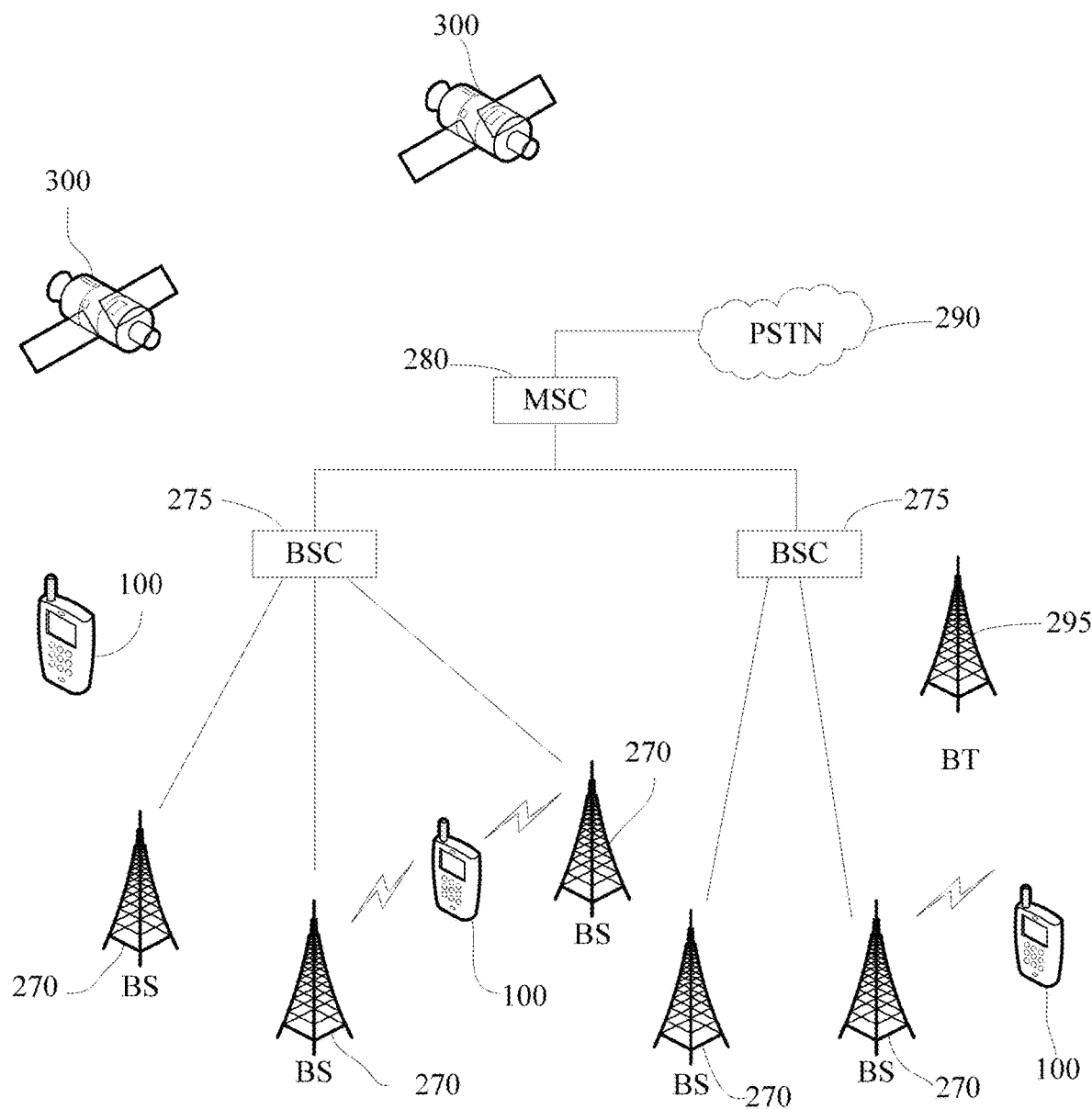
FIG. 2 is a schematic diagram of a communications system of the mobile terminal shown in FIG. 1.

Referring to FIG. 2, the CDMA wireless communications system may include a plurality of mobile terminals 100, a plurality of base stations (BS) 270, a base station controller (BSC) 275, and a mobile switching center (MSC) 280. The MSC 280 is configured to form an interface with a public switched telephone network (PSTN) 290. The MSC 280 is further configured to form an interface with the BSC 275 that can be coupled to the BS 270 by using a backhaul line. The backhaul line may be configured based on any one of a plurality of known interfaces, and the interfaces include, for example, E1/T1, ATM, IP, PPP, frame relay, HDSL, ADSL, or xDSL. It is understood that, the system shown in FIG. 2 may include a plurality of BSCs 275.

Each BS 270 may serve one or more partitions (or areas), and each partition covered by a multi-directional antenna or an antenna pointed to a specified direction is radially away from the BS 270. Alternatively, each partition may be covered by two or more antennas used for diversity reception. Each BS 270 may be configured to support a plurality of frequency assignments, and each frequency assignment has a specified spectrum (for example, 1.25 MHz and 5 MHz).

Overlapping of a partition and a frequency assignment may be referred to as a CDM channel. The BS 270 may also be referred to as a base transceiver station (BTS) or another equivalent term. In such a case, the term "base station" may be used to generally represent a single BSC 275 and at least one BS 270. The base station may also be referred to as a "cellular base station". Alternatively, partitions of a specified BS 270 may be referred to as a plurality of cellular base stations.

As shown in FIG. 2, a broadcast transmitter (BT) 295 sends a broadcast signal to a mobile terminal 100 operated in a system. The broadcast receiving unit 111 shown in FIG. 1 is configured in the mobile terminal 100 to receive the broadcast signal sent by the BT 295. In FIG. 2, several satellites 300 are shown, for example, a GPS satellite 300 may be used. The satellite 300 may be used to locate at least one of the plurality of mobile terminals 100.

In FIG. 2, a plurality of satellites 300 is described. However, it may be understood that, any quantity of satellites may be used to obtain useful location information. The location information unit 115 shown in FIG. 1 is normally configured to be engaged with the satellite 300 to obtained wanted location information. By replacing the GPS tracking technology or in addition to the GPS tracking technology, another technology that can track the location of the mobile terminal may be used. In addition, at least one GPS satellite 300 may be selectively or additionally process satellite DMB transmission.

In a typical operation of a wireless communications system, the BS 270 receives reverse link signals from various mobile terminals 100. The mobile terminal 100 normally participates in a call, message receiving and sending, and another type of communication. Each reverse link signal received by a specified base station is processed in a specified BS 270. Data that is obtained is forwarded to a related BSC 275. The BSC 275 provides call resource allocation and a mobile management function including coordination of soft handover between the BSs 270. The BSC 275 further guides the received data to the MSC 280, and the BSC 275 provides an additional routing service that forms an interface with the PSTN 290. Similarly, the PSTN 290 forms an interface with the MSC 280, the MSC 280 forms an interface with the BSC 275, and the BSC 275 correspondingly controls the BS 270 to send a forward link signal to the mobile terminal 100.

The mobile communications unit 112 of the communications unit 110 of the mobile terminal transmits, based on relevant data (including user identification information and authentication information) of a built-in access mobile communications network (for example, 2G, 3G, and 4G mobile communications networks) of the mobile terminal, mobile communication data (including uplink mobile communication data and downlink mobile communication data) for services of the user of the access mobile communications network of the mobile terminal, such as web page browsing and network multimedia playing.

The wireless Internet unit 113 of the communications unit 110 implements a function of a hotspot by running a related protocol function of the hotspot. The hotspot supports access of a plurality of mobile terminals (any mobile terminal other than the mobile terminal). By multiplexing a mobile communications connection between the mobile communications unit 112 and the mobile communications network, mobile communication data (including mobile communication data and downlink mobile communication data) is transmitted for services of the user of the mobile terminal, such as web page browsing and network multimedia playing. The mobile terminal actually transmits mobile communication data by multiplexing the mobile communications connection between the mobile terminal and the communications network, and therefore mobile communication data traffic consumed by the mobile terminal is counted into telecom expense of the mobile terminal by a charging entity on a communications network side, so that data traffic of mobile communication data included in the telecom expense subscribed by the mobile terminal is consumed.

Figure 3:
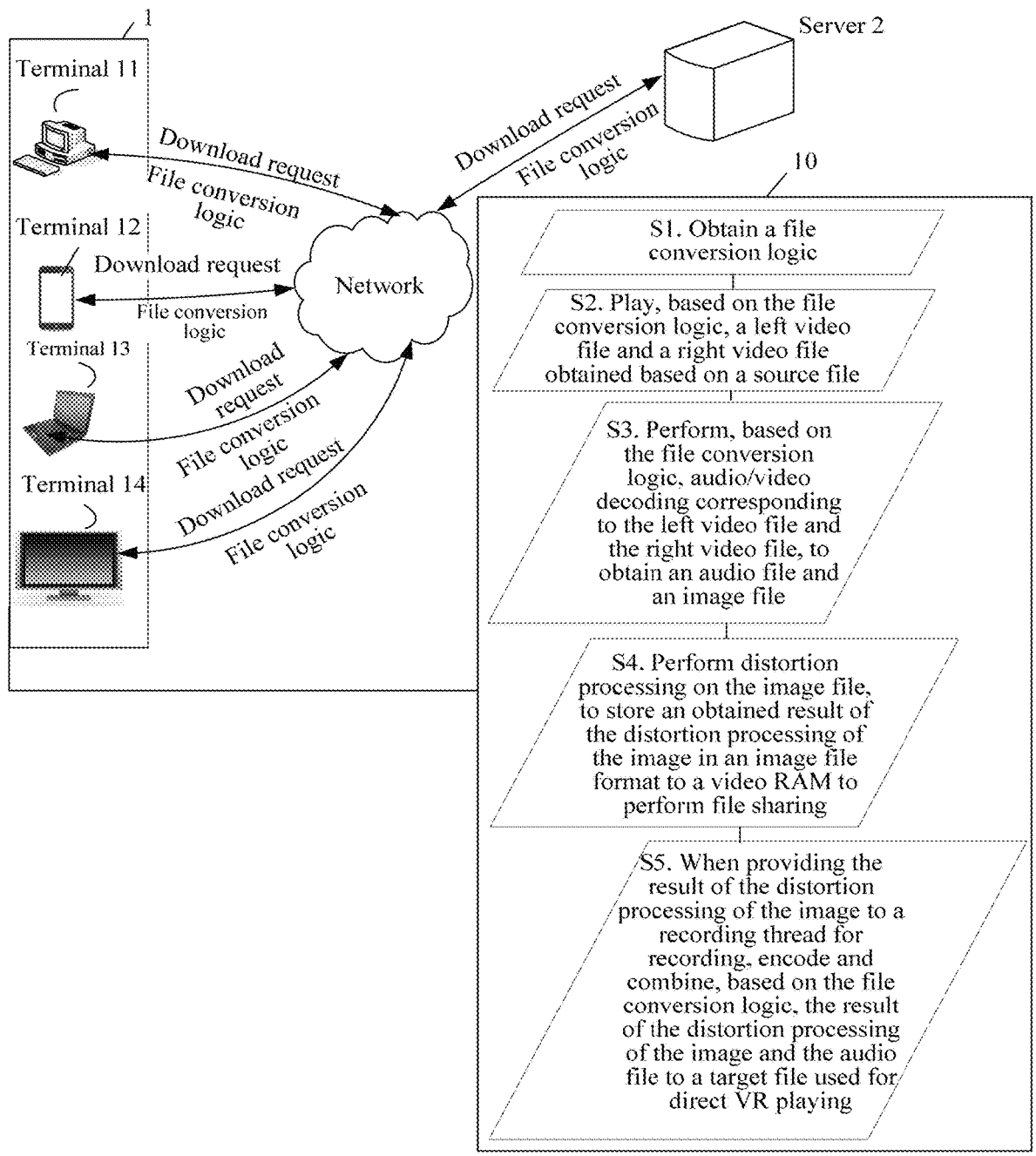
FIG. 3 is a schematic diagram of each hardware entity performing information exchange according to an embodiment.

FIG. 3 is a schematic diagram of each hardware entity performing information exchange according to an embodiment. FIG. 3 includes a terminal device 1 and a server 2. The terminal device 1 includes terminal devices 11 to 14. The terminal device performs information exchange with the server by using a wired network or a wireless network. The terminal device includes a mobile phone, a desktop, a PC, an all-in-one machine, and the like. According to this embodiment, the terminal may initiate a download request to the server, to obtain a conversion logic. During actual application, the file conversion logic may be in a form of a general installation package. The general installation package is a general installation package obtained by performing processing by a Windows platform. No specified APP needs to be installed on a mobile, and the general installation package only needs to be downloaded to the terminal to be directly used for implementing operations such as playing and distortion processing. Operation objects based on the general installation package are left/right format files of a same source file (such as a video file). In this way, a better distortion processing effect is achieved, and unlike the related art technology, the processing is not performed on the source file. Finally, processing results are separately projected on the VR glasses for playing. This is more convenient and quick.

In this embodiment, the obtained result of the distortion processing is stored in an image file format to a video RAM for performing file sharing, so that there is no need to perform a plurality of times of copy operations, and a required file only needs to be obtained from sharing during recording, not only improving efficiency, but also preventing excessive occupancy of a CPU and a memory. After an instruction for a recording operation is received, the result of the distortion processing is provided to a recording thread for recording, and finally the result of the distortion processing and the audio file are encoded and combined into a first target file and a second target file that are directly used for VR playing. It can be learned that, according to this embodiment, a file conversion logic (for example, a general installation package) is generated by performing processing in a background Windows platform, and the terminal obtains the file conversion logic (for example, the general installation package) and directly uses the file conversion logic (for example, the general installation package) for processing.

Specifically, a processing logic 10 executed by the terminal device is shown in FIG. 3, and the processing logic 10 includes operations S1-S5:

S1. Obtain a file conversion logic, the file conversion logic being a logic generated on the server side based on a player plug-in, an SDK, and a recording plug-in that are loaded and run in a designated 3D operation environment.

S2. Play, based on the file conversion logic, a left video file and a right video file obtained based on a source file, the left video file being a file played based on the source file and displayed on a left side of a screen of the terminal, and the right video file being a file played based on the source file and displayed on the right side of a screen of the terminal.

S3. Perform, based on the file conversion logic, audio/video decoding corresponding to the left video file and the right video file, to obtain an audio file and an image file.

S4. Perform distortion processing on the image file, to store an obtained result of the distortion processing of the image in an image file format to a video RAM to perform file sharing.

S5. Receive an instruction for a recording operation, and when providing the result of the distortion processing of the image to a recording thread for recording, encode and combine, based on the file conversion logic, the result of the distortion processing of the image and the audio file to a target file used for direct VR playing, the target file being the first target file and the second target file respectively corresponding to initial files (the left video file and the right video file), to finally directly play the first target file and the second target file on a pair of VR glasses.

The example in FIG. 3 is merely a system architecture example for implementing the embodiments. The exemplary embodiments are not limited to the system structure shown in FIG. 3. For illustrative purposes, based on the system architecture shown in FIG. 3, each embodiment of the method described herein is provided.

A file processing method according to an embodiment is provided. As shown in FIG. 4, the method includes operations 101-105.)

101: Obtain a file conversion logic, the file conversion logic being a logic generated on a server side based on a player plug-in, a software development kit (SDK), and a recording plug-in that are loaded and run in a designated 3D operation environment. In this way, during subsequent specific processing, the file conversion logic may be used for a series of operations such as playing, audio/video decomposition, distortion, and target file recording. When the file conversion logic exists in a form of an SDK installation package, and the installation package is a general installation package obtained after processing performed by a Windows platform, without installing a specified APP, any terminal may directly use the installation package to implement operations such as playing and distortion processing by only downloading the general installation package to the terminal. That is, the general installation package is used to process a source file to obtain a target file, and the target file may further be shared on a network.

102: When the file conversion logic is used for the series of operations such as playing, audio/video decomposition, distortion, and target file recording, first, play a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal.

103: Perform audio/video decoding on each of the first to-be-processed file and the second to-be-processed file based on the file conversion logic, to obtain an audio file and an image file that correspond to each of the first to-be-processed file and the second to-be-processed file.)

104: Perform distortion processing on the image file corresponding to each of the first to-be-processed file and the second to-be-processed file, and store an obtained result of the distortion processing in an image file format in a video RAM to perform file sharing.

105: Receive an instruction for a recording operation, and when providing the result of the distortion processing to a recording thread for recording, encode and combine, based on the file conversion logic, the result of the distortion processing and the audio file that corresponds to each of the first to-be-processed file and the second to-be-processed file into a first target file and a second target file that are directly used for VR playing. For example, the result of the distortion processing and the audio file that correspond to the first to-be-processed are encoded and combined into the first target file, and the result of the distortion processing and the audio file that correspond to the second to-be-processed are encoded and combined into the second target file.

The VR technology is a computer simulation system that can create and experience a virtual world. In the VR technology, a computer is used to generate a staging environment, to provide a 3D dynamic interactive and multisourcing information integration information scene and system simulation of an entity behavior, so that a user can immerse in the staging environment. VR mainly includes aspects such as a staging environment, sensing, natural technique, and sensing device. The staging environment is a real-time dynamic 3D vivid image generated by the computer. The sensing refers to that an ideal VR needs to have all sensing that a human has. In addition to visual sensing generated by using a graphic technology of the computer, there are also sensing such as auditory sense, sense of touch, force sense, and motion, and even olfactory sense and taste sense are included. These are referred to as multisensing. The natural technique refers to turning of man's head, eyes, gestures, or another human behavior action, the computer processes data adapted to the actions of the participant, responds to an input of the user in real time, and respectively sends feedbacks to facial features of the user. The sensing device refers to a 3D interactive device.

As VR develops, VR vendors introduce a pair of VR glasses of their own. A new human-computer interaction manner is obtained by using such VR glasses. Due to more natural and more stereoscopic environment simulation of the VR glasses, with the popularity of mobile terminals, mobile VR steps into common consumers' life more quickly. The VR glasses not only support a panoramic image, but also support a 3D image. However, current 3D video playing can be converted only by installing a specified APP, which not only is inconvenient but also fails to support 3D playing on a web page. This is because normally, an APP installed on a terminal is only a video player that does not have a web page browsing function, thereby failing to support 3D playing on a web page. At present, most 3D videos are in a left/right format, and such a format cannot be directly normally viewed in a pair of VR glasses. This is because the VR glasses needs to project a distorted image on the glasses, so that a 3D effect can be generated.

During actual application, a mobile VR scenario is used as an example. By using an embodiment, a processing logic (such as a file conversion logic) based on file conversion can be played by using any built-in player of a mobile terminal. The user can further conveniently upload a converted target video file to a video website, to facilitate sharing, and therefore the user can experience a 3D video on the web page. For the processing logic (such as the file conversion logic) based on the file conversion, a new video file is played, decoded, distorted, recorded, saved, and shared in a combined manner of VLC+Unity3D+CardboardSDK+OBS. Specifically, the file conversion logic is used for performing distortion conversion on videos of a left/right format and saving the video as video files of a same format that can be played on any video player on a mobile phone terminal without being processed by using a specified APP. A generated file is shared to the web page and is played on the web page.

In the related art technology, an original source file is processed, and finally, the original source file further needs to be projected to the VR glasses to be displayed. This limits a format. However, according to an exemplary embodiment, the source file is processed by displaying, by the VR glasses, required left and right format videos. This is not limited by a format, and subsequently, the file can be directly viewed through the VR glasses without being projected on a screen. In addition, a distorted image is shared by using the video RAM, avoiding a plurality of times of copy in a recording process and avoiding excessive occupancy of a CPU and a memory. Therefore, total processing efficiency is affected, high efficiency is achieved, and there is no delay of image transmission, so that CPU and memory resources are saved.

For details of methods to generate the foregoing processing logic based on file conversion (for example, the file conversion logic) on background Windows, VLC refers to video decoding and audio decoding; Cardboard refers to image distortion; OBS refers to perform encoding and compression on the distorted image, to save the file. Running in a Unity environment of a Windows platform, a Cardboard SDK plug-in package is introduced. The Cardboard SDK is used for performing distortion. The Cardboard SDK may adapt to a distortion parameter based on a screen aspect ratio and a resolution, and preconfigure a plurality of mobile models. The Cardboard SDK is a complete development kit, an exemplary embodiment only uses a distortion function herein, and therefore the Cardboard SDK needs to be CUT. There is no player for any type of video format in the Unity. VLC is a full-platform and full-format player, a player plug-in whose VLC is in Unity is made, and audio and images of a 3D video each may be decoded by using the VLC, and then distortion processing is performed on important images that need to be processed. As a recording tool on the Windows platform, OBS has its own plug-ins that can perform recording for a window. Copy operations need to be performed for the window recording for a plurality of times, efficiency is low, and consumption of a CPU and a memory is significant. According to an exemplary embodiment, the foregoing aspect is optimized, and two plug-ins are separately written, one is used in Unity, and a distorted image is shared by using the video RAM. The other is used in OBS, an image is obtained from the video RAM and is directly handed to the recording thread. In this way, in a process of image copying, operations are performed in the video RAM, and therefore the copy operations consume no memory and no CPU. OBS saves distorted images and voices as a target video file by performing compression and encoding.

Figure 5:
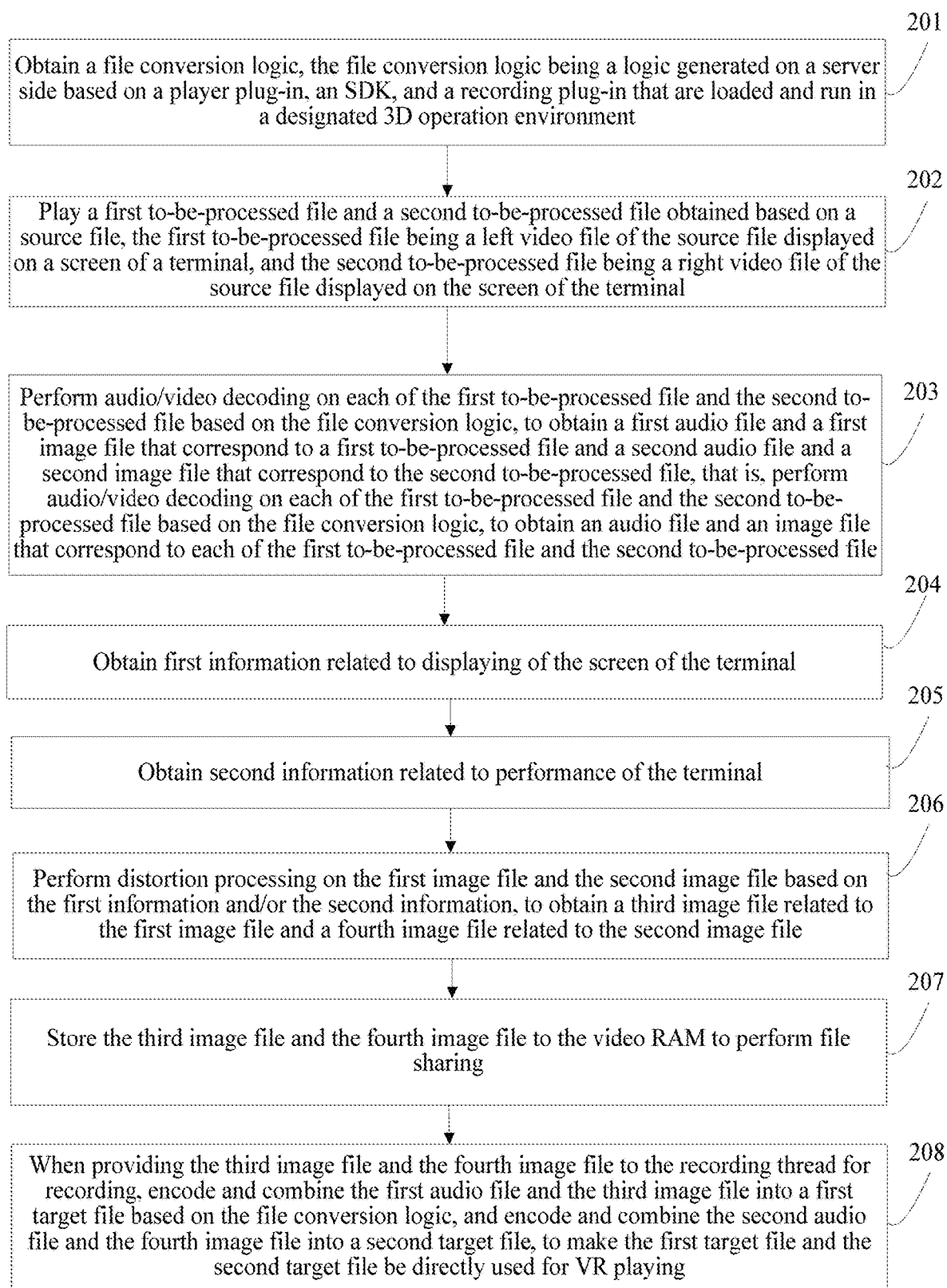
FIG. 5 is a schematic diagram of a method implementation procedure according to another embodiment.

A file processing method according to an embodiment is illustrated in FIG. 5. As shown in FIG. 5, the method includes operations 201-208.

201: Obtain a file conversion logic, the file conversion logic being a logic generated on a server side based on a player plug-in, an SDK, and a recording plug-in that are loaded and run in a designated 3D operation environment. In this way, during subsequent specific processing, the file conversion logic may be used for a series of operations such as playing, audio/video decomposition, distortion, and target file recording. When the file conversion logic exists in a form of an SDK installation package, and the installation package is a general installation package obtained after processing performed by a Windows platform, without installing a specified APP, any terminal may directly use the installation package to implement operations such as playing and distortion processing by only downloading the general installation package to the terminal. That is, the general installation package is used to process a source file to obtain a target file, and the target file may further be shared on a network.

202: When the file conversion logic is used for the series of operations such as playing, audio/video decomposition, distortion, and target file recording, first, play a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal.

203: Perform audio/video decoding on each of the first to-be-processed file and the second to-be-processed file based on the file conversion logic, to obtain a first audio file and a first image file that correspond to the first to-be-processed file and a second audio file and a second image file that correspond to the second to-be-processed file, that is, perform audio/video decoding on each of the first to-be-processed file and the second to-be-processed file based on the file conversion logic, to obtain an audio file and an image file that correspond to each of the first to-be-processed file and the second to-be-processed file.

204: In the process of performing distortion processing on the image files respectively corresponding to the first to-be-processed file and the second to-be-processed file, obtain first information related to displaying of the screen of the terminal, the first information including information of at least one of a screen aspect ratio or a resolution.

205: Obtain second information related to performance of the terminal, the second information including information of at least one of a model of the terminal or a performance index of a processor of the terminal.

206: Perform distortion processing on the first image file and the second image file based on the first information and/or the second information, to obtain a third image file related to the first image file and a fourth image file related to the second image file.

207: Store the third image file and the fourth image file in the video RAM to perform file sharing, to store an obtained result of the distortion processing in an image file format in a video RAM to perform file sharing.

208: Receive an instruction for a recording operation, and when providing the third image file and the fourth image file to the recording thread for recording, encode and combine the first audio file and the third image file into a first target file based on the file conversion logic, and encode and combine the second audio file and the fourth image file into a second target file, to make the first target file and the second target file be directly used for VR playing.

The VR technology is a computer simulation system that can create and experience a virtual world. In the VR technology, a computer is used to generate a staging environment, to provide a 3D dynamic interactive and multisourcing information integration information scene and system simulation of an entity behavior, so that a user can immerse in the staging environment. VR mainly includes aspects such as a staging environment, sensing, natural technique, and sensing device. The staging environment is a real-time dynamic 3D vivid image generated by the computer. The sensing refers to all sensing that a human has that an ideal VR needs to have. In addition to visual sensing generated by using a graphic technology of the computer, there are also sensing such as auditory sense, sense of touch, force sense, and motion, and even olfactory sense and taste sense. These are referred to as multisensing. The natural technique refers to turning of man's head, eyes, gestures, or another human behavior action, the computer processes data adapted to the actions of the participant, responds to an input of the user in real time, and respectively sends feedbacks to facial features of the user. The sensing device refers to a 3D interactive device.

According to an exemplary embodiment, in a scenario in which the first target file and the second target file are integrated with the VR glasses, processing is performed by directly displaying the source file as a left-right videos by using the VR glasses, and therefore a displaying format and an application range do not constitute a limitation. The VR glasses may directly use the foregoing target file, and may be used for viewing on any terminal or web page. In this way, no projection process needs to be performed, processing efficiency is improved, and a file format is more compatible with various terminals and application ranges. Distortion of different degrees is unavoidable when the target file is played by using various terminals, and therefore in exemplary embodiments, for distortion possibility of different terminals, adjustment is performed by using a corresponding parameter by using a file conversion logic, to ensure that a final playing effect is clear and without distortion. Specifically, the distortion parameter is related to information such as a screen aspect ratio, a resolution, or a model of a terminal such as a mobile phone terminal.

In the related art technology, an original source file is processed, and finally the original source file further needs to be projected to the VR glasses to be displayed. This limits a format. However, in an exemplary embodiment, the source file is processed by displaying, by the VR glasses, required left and right format videos. This is not limited by a format, and subsequently, the file can be directly viewed by using through VR without being projected on a screen. In addition, a distorted image is shared by using the video RAM, avoiding a plurality of times of copy in a recording process and avoiding excessive occupancy of a CPU and a memory. Therefore, total processing efficiency is improved, high efficiency is achieved, and there is no delay of image transmission, so that CPU and memory resources are saved.

For details of methods to generate the foregoing processing logic based on file conversion (for example, the file conversion logic) on background Windows, VLC refers to video decoding and audio decoding; Cardboard refers to image distortion; OBS refers to perform encoding and compression on the distorted image, to save the file. Running in a Unity environment of a Windows platform, a Cardboard SDK plug-in package is introduced. The Cardboard SDK is used for performing distortion. The Cardboard SDK may adapt to a distortion parameter based on a screen aspect ratio and a resolution, and preconfigure a plurality of mobile models. The Cardboard SDK is a complete development kit, an exemplary embodiment only uses a distortion function herein, and therefore the Cardboard SDK needs to be CUT. There is no player for any type of video format in the Unity. VLC is a full-platform and full-format player, a player plug-in of VLC is made in Unity, and audio and images of a 3D video each may be decoded by using the VLC, and then distortion processing is performed on important images that need to be processed. As a recording tool on the Windows platform, OBS has its own plug-ins that can perform recording for a window. Copy operations need to be performed for the window recording for a plurality of times, efficiency is low, and consumption of a CPU and a memory is significant. In an exemplary embodiment, the foregoing aspect is optimized, and two plug-ins are separately written, one is used in Unity, and a distorted image is shared by using the video RAM. The other is used in OBS, an image is obtained from the video RAM and is directly handed to the recording thread. In this way, in a process of image copying, operations are performed in the video RAM, and therefore the copy operations consume no memory and no CPU. OBS saves distorted images and voices as a target video file by performing compression and encoding.

Based on the foregoing descriptions, in an exemplary embodiment, the method may further include: receiving an instruction for a file sharing operation, and sharing the first target file and the second target file with a target user according to an address of the target user; or sharing the first target file and the second target file on a corresponding web page according to a link address of the web page.)

Based on the foregoing descriptions, in an exemplary embodiment, the method may further include: storing the first target file and the second target file by using video files of a same format.

According to a file processing system in an exemplary embodiment, the terminal may initiate a download request to the server, to obtain a conversion logic. During actual application, the file conversion logic may be in a form of a general installation package. The general installation package is a general installation package obtained by performing processing by a Windows platform. No specified APP needs to be installed on a mobile, and the general installation package only needs to be downloaded to the terminal to be used for implementing operations such as playing and distortion processing. Operation objects based on the general installation package are left/right format files of a same source file (such as a video file). In this way, a better distortion processing effect is achieved, and unlike the related art technology, the processing is not performed on the source file. Finally, processing results are separately projected on the VR glasses for playing. This is more convenient and quick. In an exemplary embodiment, the obtained result of the distortion processing is stored in an image file format to a video RAM for performing file sharing, so that there is no need to perform a plurality of times of copy operations, and a required file only needs to be obtained from sharing during recording, thereby not only improving efficiency, but also preventing excessive occupancy of a CPU and a memory. After an instruction for a recording operation is received, the result of the distortion processing is provided to a recording thread for recording, and finally the result of the distortion processing and the audio file are encoded and combined into a first target file and a second target file that are directly used for VR playing.

It can be learned that, according to an exemplary embodiment, a file conversion logic (for example, a general installation package) is generated by performing processing in a background Windows platform, and the terminal obtains the file conversion logic (for example, the general installation package) and directly uses the file conversion logic (for example, the general installation package) for processing.

Figure 6:
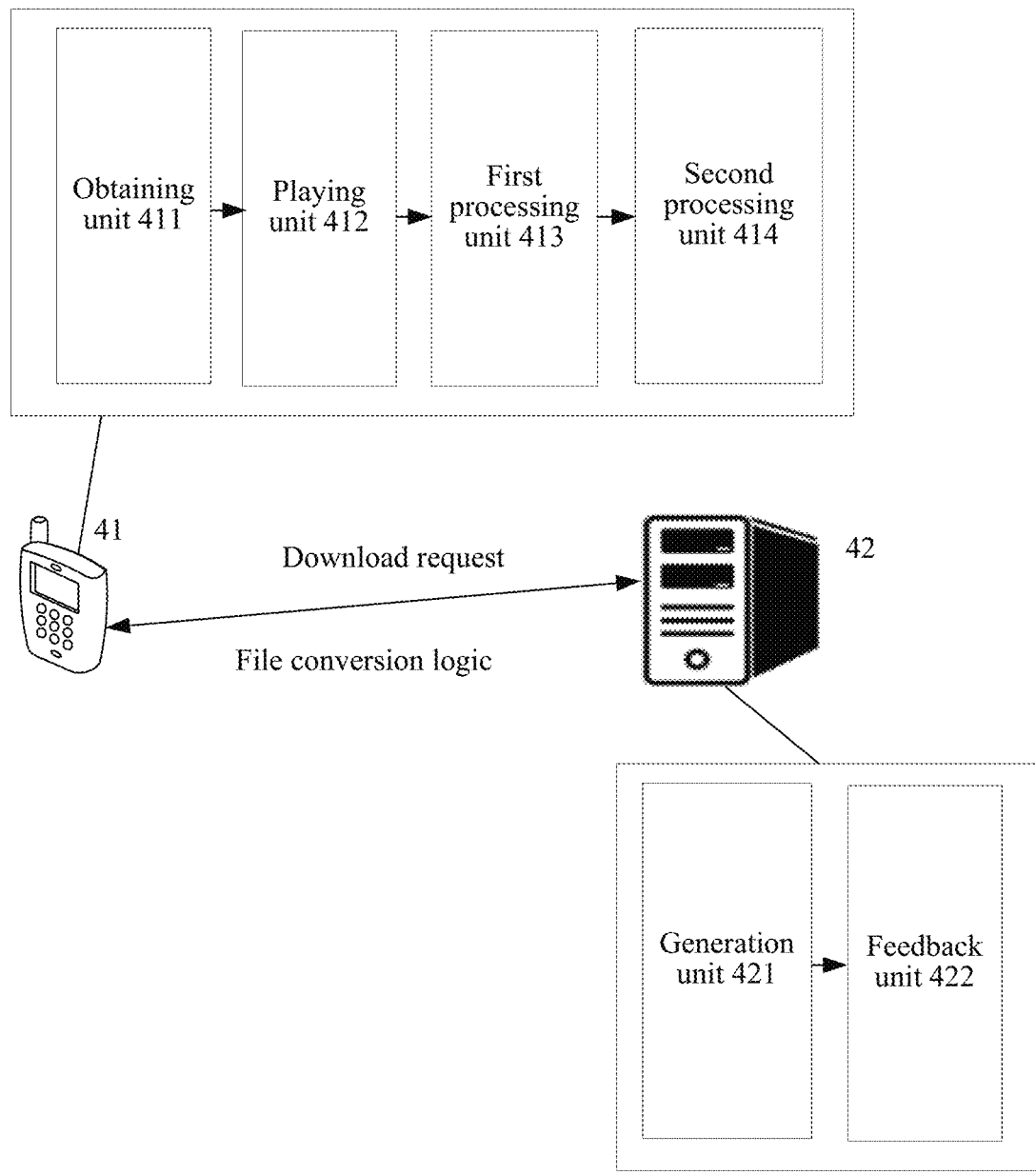
FIG. 6 is a schematic architectural diagram of a system according to an embodiment.

As shown in FIG. 6, the file processing system includes a terminal 41 and a server 42. The terminal 41 includes: an obtaining unit 411, configured to obtain a file conversion logic; a playing unit 412, configured to play a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal; a first processing unit 413, configured to: perform audio/video decoding on each of the first to-be-processed file and the second to-be-processed file based on the file conversion logic, to obtain an audio file and an image file that correspond to each of the first to-be-processed file and the second to-be-processed file, perform distortion processing on the image file corresponding to each of the first to-be-processed file and the second to-be-processed file, and store an obtained result of the distortion processing in an image file format in a video RAM to perform file sharing; and a second processing unit 414, configured to: receive an instruction for a recording operation, and when providing the result of the distortion processing to a recording thread for recording, encode and combine, based on the file conversion logic, the result of the distortion processing and the audio file that corresponds to each of the first to-be-processed file and the second to-be-processed file into a first target file and a second target file that are directly used for VR playing. The server 42 includes: a generation unit 421, configured to generate, based on a player plug-in (such as VLC), SDK (such as Cardboard SDK), and a recording plug-in (such as OBS) that are loaded and run in a specified designated 3D operation environment (for example, Unity), a file conversion logic; and a feedback unit 422, configured to feed back the file conversion logic to the terminal in response to a download request initiated by a terminal.

During actual application, a mobile VR scenario is used as an example. By using an embodiment, a processing logic (such as a file conversion logic) based on file conversion can be played by using any built-in player of a mobile terminal. The user can further conveniently upload a converted target video file to a video website, to facilitate sharing, and therefore the user can experience a 3D video on the web page. For the processing logic (such as the file conversion logic) based on the file conversion, a new video file is played, decoded, distorted, recorded, saved, and shared in a combined manner of VLC+Unity3D+CardboardSDK+OBS. Specifically, the file conversion logic is used for performing distortion conversion on videos of a left/right format and saving the video as video files of a same format that can be played on any video player on a mobile phone terminal, without being processed by using a specified APP. A generated file is shared to the web page and is played on the web page.

In the related art technology, an original source file is processed, and finally the original source file further needs to be projected to the VR glasses to be displayed. This limits a format. In contrast, according to an exemplary embodiment, the source file is processed by displaying, by the VR glasses, required left and right format videos. This is not limited by a format, and subsequently, the file can be directly viewed through VR glasses without being projected on a screen. In addition, a distorted image is shared by using the video RAM, avoiding a plurality of times of copy in a recording process and avoiding excessive occupancy of a CPU and a memory. Therefore, total processing efficiency is improved, high efficiency is achieved, and there is no delay of image transmission, so that CPU and memory resources are saved.

For details of methods to generate the foregoing processing logic based on file conversion (for example, the file conversion logic) on background Windows on the server side, VLC refers to video decoding and audio decoding; Cardboard refers to image distortion; OBS refers to perform encoding and compression on the distorted image, to save the file. Running in a Unity environment of a Windows platform, a Cardboard SDK plug-in package is introduced. The Cardboard SDK is used for performing distortion. The Cardboard SDK may adapt to a distortion parameter based on a screen aspect ratio and a resolution, and preconfigure a plurality of mobile models. The Cardboard SDK is a complete development kit, an exemplary embodiment only uses a distortion function herein, and therefore the Cardboard SDK needs to be CUT. There is no player for any type of video format in the Unity. VLC is a full-platform and full-format player, a player plug-in of VLC is made in Unity, and audio and images of a 3D video each may be decoded by using the VLC, and then distortion processing is performed on important images that need to be processed. As a recording tool on the Windows platform, OBS has its own plug-ins that can perform recording for a window. Copy operations need to be performed for the window recording for a plurality of times, efficiency is low, and consumption of a CPU and a memory is significant. In an exemplary embodiment, the foregoing aspect is optimized, and two plug-ins are separately written, one is used in Unity, and a distorted image is shared by using the video RAM. The other is used in OBS, an image is obtained from the video RAM and is directly handed to the recording thread. In this way, in a process of image copying, operations are performed in the video RAM, and therefore the copy operations consume no memory and no CPU. OBS saves distorted images and voices as a target video file by performing compression and encoding.

In an implementation of an exemplary embodiment, the first processing unit of the terminal is further configured to perform audio/video decoding on each of the first to-be-processed file and the second to-be-processed file based on the file conversion logic, to obtain a first audio file and a first image file that correspond to the first to-be-processed file and a second audio file and a second image file that correspond to the second to-be-processed file.

In an implementation of an exemplary embodiment, the first processing unit of the terminal is further configured to: obtain first information related to displaying of the screen of the terminal; obtain second information related to performance of the terminal; and perform distortion processing on the first image file and the second image file based on the first information and/or the second information, to obtain a third image file related to the first image file and a fourth image file related to the second image file, and store the third image file and the fourth image file in the video RAM to perform file sharing. The first information includes information of at least one of a screen aspect ratio or a resolution, and the second information includes information of at least one of a model of the terminal or a performance index of a processor of the terminal.

In an implementation of an exemplary embodiment, the second processing unit of the terminal is further configured to: receive an instruction for a recording operation, and when providing the third image file and the fourth image file to the recording thread for recording, encode and combine the first audio file and the third image file into a first target file based on the file conversion logic, and encode and combine the second audio file and the fourth image file into a second target file.

In an implementation of an exemplary embodiment, the terminal further includes a sharing unit, configured to: receive an instruction for a file sharing operation, and sharing the first target file and the second target file with a target user according to an address of the target user; or share the first target file and the second target file on a corresponding web page according to a link address of the web page.

In an implementation of an exemplary embodiment, the terminal further includes a storage unit, configured to store the first target file and the second target file by using video files of a same format.

In an implementation of an exemplary embodiment, the generation unit of the server is further configured to: introduce the SDK into the designated 3D operation environment; load and run the player plug-in in the designated 3D operation environment, and perform, by using the player plug-in, audio/video decoding on a first to-be-processed file and a second to-be-processed file obtained based on a source file, to obtain an audio file and an image file that correspond to each of the first to-be-processed file and the second to-be-processed file; when it learns, through monitoring, that the image file is distorted, perform distortion processing on the image file corresponding to each of the first to-be-processed file and the second to-be-processed file by using the SDK; and before a recording thread is started by using the recording plug-in to perform recording, store an obtained result of the distortion processing in an image file format to a video RAM to perform file sharing.

In an implementation of an exemplary embodiment, the recording plug-in in the server includes a first plug-in related to the video RAM in the designated 3D operation environment and a second plug-in responding to the recording operation. The server includes: a communications unit, configured to communicate with the video RAM by using the first plug-in, and extract the result of the distortion processing from the video RAM; and a recording unit, configured to: respond to the recording operation, communicate, by the second plug-in with the first plug-in, to provide the result of the distortion processing to the recording thread for recording, and encode and combine, based on the file conversion logic, the result of the distortion processing and the audio file that corresponds to each of the first to-be-processed file and the second to-be-processed file into a first target file and a second target file that are directly used for virtual reality VR playing.

For a processor used for data processing, processing may be performed by using a microprocessor, a central processing unit (CPU), a DSP or an FPGA. A storage medium includes an operation instruction. The operation instruction may be computer-executable code, and the steps of the information processing method procedure in the embodiments are implemented by using the operation instruction.

It should be noted that, the descriptions above related to the terminal and the server are similar to the method descriptions above and are the same as the descriptions of beneficial effects of the method, and are not described herein again. For technical details that are not disclosed in the terminal and server embodiments, refer to the descriptions of the embodiments of the method procedure.

An actual application scenario is used as an example to describe an embodiment below:

With the development of the VR technology, the VR glasses are popularized. Such a new man-machine interaction manner is limited to the hardware costs of the PC VR. Mobile VR can better satisfy a use demand of common consumers. The VR glasses not only support a panoramic image, but also support a three-dimensional (3D) image. However, currently, a 3D video can be played only by installing an APP. This is inconvenient and cannot support 3D playing on a web page.

Figure 7:
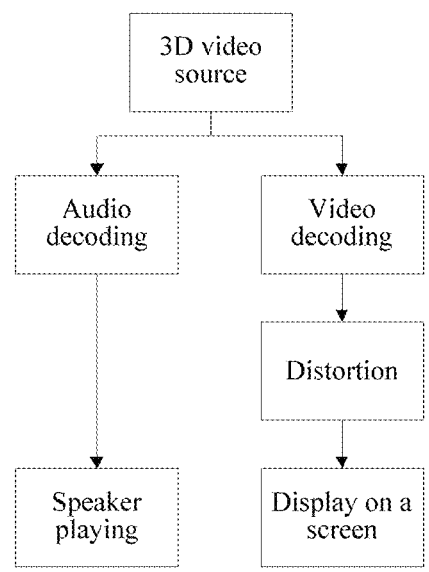
FIG. 7 is a schematic diagram of performing file conversion by using a specialized APP.

FIG. 7 shows a procedure in which VR playing is performed by using an APP including video content, game content, and a video player. In this procedure, after audio/video decoding is performed on a video source, distortion processing is performed on an image obtained after the audio/video decoding. Finally, the audio is played by using a speaker, and the image on which the distortion processing is performed is projected on a VR screen to be played. At present, most of 3D videos are in a left/right format, and the processing manner based on the procedure is performing processing on the 3D video source. In this manner, a video cannot be normally viewed by directly using the VR glasses. This is because only by projecting a distorted image on the glasses can a 3D effect be generated by using the VR glasses. A specific APP needs to be installed, and web page playing is not supported. Due to this problems, demands of common consumers are not satisfied.

For the foregoing problems, according to this embodiment, a combination manner of VLC+Unity3D+CardboardSDK+OBS may be used, so that distortion conversion is performed for videos of a left/right video and the videos are stored as video files of a same format. For example, the videos may be performed by using any video player of a mobile phone terminal and on a web page. A 3D video effect can be experienced by wearing a pair of VR glasses. A file conversion logic is generated by using the combination manner of VLC+Unity3D+CardboardSDK+OBS and is run on a Windows platform. Then, the file conversion logic is feedback to the terminal according to a download request of the terminal to be directly used by the terminal, to implement audio/video decoding, distortion processing, encoding and combination, recording and storage, and a web page sharing function of left/right format files of the source file.

Specifically, for the file conversion logic, in a Unity environment, a Cardboard SDK plug-in packet is introduced. The Cardboard SDK is used for performing distortion. The Cardboard SDK may adapt to a distortion parameter based on a screen aspect ratio and a resolution, and preconfigure a plurality of mobile models. The Cardboard SDK is a complete development kit, an exemplary embodiment only uses a distortion function herein, and therefore the Cardboard SDK needs to be CUT. There is no player for any type of video format in the Unity. VLC is a full-platform and full-format player, a player plug-in whose VLC is in Unity needs to be made herein, and audio and images of a 3D video each may be decoded by using the VLC, and then distortion processing is performed on important images.

Figure 8:
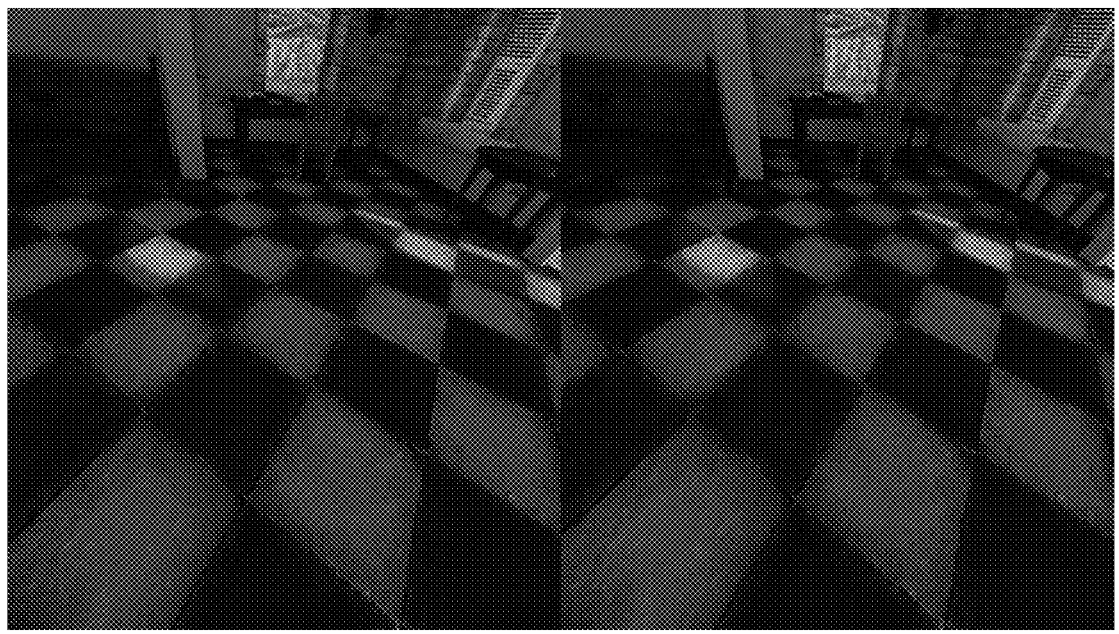
FIG. 8 and FIG. 9 are respectively a schematic diagram of an application scenario before distortion and that after distortion.
Figure 9:
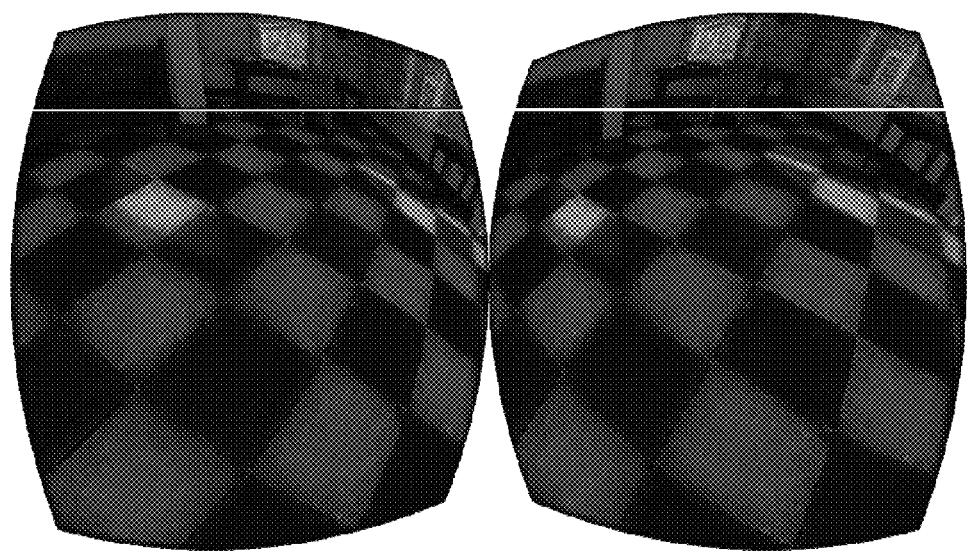

Images before and after distortion are shown in FIG. 8 and FIG. 9. FIG. 8 shows images before distortion, and FIG. 9 shows images after distortion. OBS is a recording tool on the Windows platform, and its own plug-ins can perform recording for a window. Copy operations need to be performed for the window recording for a plurality of times, efficiency is low, and consumption of a CPU and a memory is significant. According to an exemplary embodiment, the foregoing aspect is optimized, and two plug-ins are separately written, one is used in Unity, and a distorted image is shared by using the video RAM. The other is used in OBS, an image is obtained from the video RAM and is directly handed to the recording thread. In this way, in a process of image copying, operations are performed in the video RAM, and therefore the copy operations consume no memory and no CPU. The OBS stores distorted images and voice as new video file by means of compression and encoding. The file may be directly played by using a mobile phone carried player, or may be uploaded to a video website to be played on the web page. In this way, the costs of sharing and experiencing a 3D video by a user are greatly reduced. VLC refers to video decoding and audio decoding. Cardboard refers to image distortion. OBS refers to performing encoding and compression on distorted images and audio, and storing the file.

Figure 10:
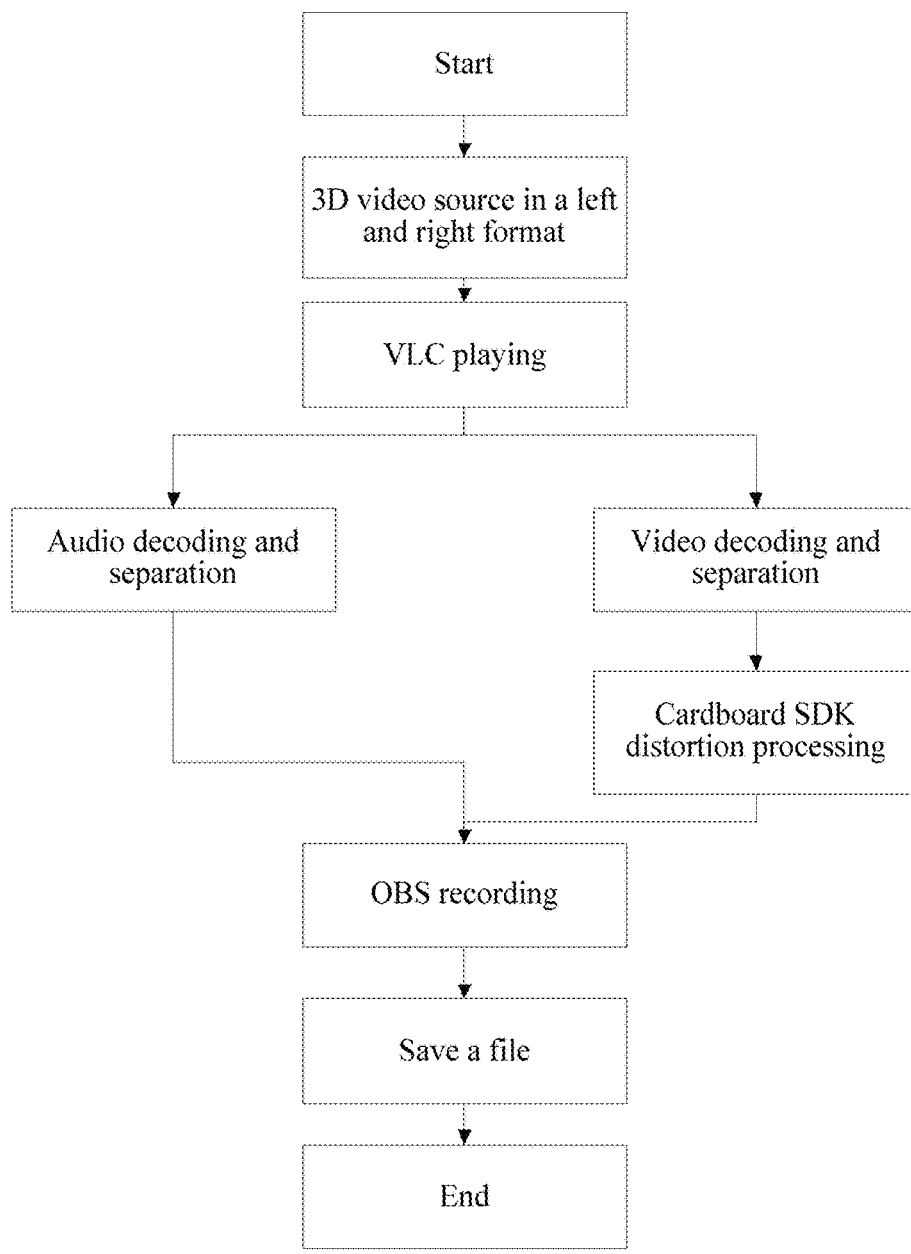
FIG. 10 is a flowchart of performing file conversion by using an embodiment.

FIG. 10 shows a file conversion procedure according to an exemplary embodiment. In the procedure, audio/video decoding, distortion processing, encode and combine, and recording and storage are performed based on the foregoing file conversion logic on 3D source videos of a left/right format from a 3D video source (for example, a 3D video file). Player plug-in VLC is used to play the 3D source video of a left/right format, audio/video decoding is performed on the 3D source video of a left/right format, distortion processing is performed on an image obtained after the video decoding, and a result of the distortion processing is put into the video RAM for sharing. When recording is performed by using OBS of the recording plug-in, an audio file and the result of the distortion processing of the image shared in the video RAM are obtained, and the two are encoded and combined and are stored, to obtain a new video file. The new video file is directly played on the VR.

Figure 11:
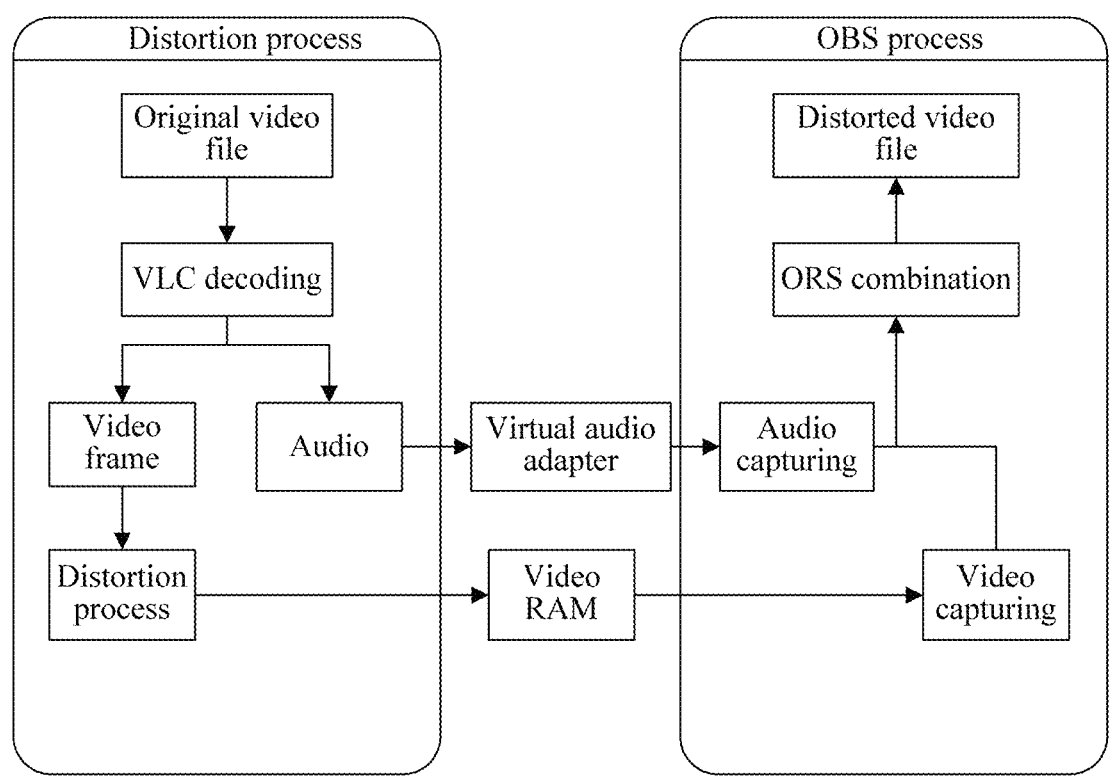
FIG. 11 is a schematic diagram of composing a new video file by performing distortion processing according to an embodiment.

Interactive processing between the distortion process and OBS recording process according to an exemplary embodiment is shown in FIG. 11. In the distortion process, distortion processing needs to be performed on a distorted video, to eliminate effect of the distortion. Specifically, an original video file is obtained, encoding is performed by using the player plug-in VLC, a video frame and an audio frame are separated (that is, audio/video decoding and separation is performed on a 3D source video of a left/right format), the audio frame is placed into a virtual audio adapter, and the distortion processing is performed only on the video frame. A result of the distortion processing obtained by performing the distortion processing on the video frame is placed into the video RAM. A benefit of sharing in the video RAM is: the result of the distortion processing is stored in an image file format in the video RAM for file sharing, so that there is no need to perform a plurality of times of copy operations, and a required file only needs to be obtained from sharing during recording, which not only improves efficiency, but also prevents excessive occupancy of a CPU and a memory. In the OBS process, when recording is performed by using the recording plug-in OBS, an audio and the result of the distortion processing of the video shared in the video RAM are captured. After a recording operation is received, the result of the distortion processing is provided to a recording thread for recording, and the two are encoded and combined and are stored, to obtain a new video file. The new video file is directly played on the VR.

In an actual application based on the file conversion procedure, the solution according to an exemplary embodiment is a function of VR Capture. VR Capture is a recording and sharing tool of VR PC glasses, and distortion conversion is performed on a left/right format videos recorded by the VR Capture, to generate a new video file. VR Capture shares the generated file on the web page. The solution according to an exemplary embodiment further provides an interface DLL to the outside, to directly call start conversion and end convention. In addition, the solution according to an exemplary embodiment further provides call-back of a conversion process.

A computer storage medium of an embodiment may be a memory including a computer program. The computer program may be executed by a processor of a data processing apparatus, to complete the steps of the method in the foregoing embodiments. The computer storage medium may be a memory such as a FRAM, a ROM, a PROM, an EPROM, an EEPROM, a Flash Memory, a magnetic memory, an optical disc, or a CD-ROM; or may be a device including one of or any combination of the foregoing memories, such as a mobile phone, a computer, a tablet device, or a PDA.

The computer-readable storage medium stores the computer program. When the computer program is run by the processor, the following file processing method is performed.

On one hand, when locating on the terminal side, the computer-readable storage medium includes the following content:

In an exemplary embodiment, when the computer program is run by the processor, the following steps are further performed:

obtaining a file conversion logic, the file conversion logic being a logic generated on a server side based on a player plug-in, a software development kit SDK, and a recording plug-in that are loaded and run in a designated 3D operation environment;

playing a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal;

performing audio/video decoding on each of the first to-be-processed file and the second to-be-processed file based on the file conversion logic, to obtain an audio file and an image file that correspond to each of the first to-be-processed file and the second to-be-processed file, performing distortion processing on the image file corresponding to each of the first to-be-processed file and the second to-be-processed file, and storing an obtained result of the distortion processing in an image file format in a video RAM to perform file sharing; and receiving an instruction for a recording operation, and when providing the result of the distortion processing to a recording thread for recording, encoding and combining, based on the file conversion logic, the result of the distortion processing and the audio file that corresponds to each of the first to-be-processed file and the second to-be-processed file into a first target file and a second target file that are directly used for VR playing.

In an embodiment, when the computer program is run by the processor, the following steps are further performed:

performing audio/video decoding on each of the first to-be-processed file and the second to-be-processed file based on the file conversion logic, to obtain a first audio file and a first image file that correspond to the first to-be-processed file and a second audio file and a second image file that correspond to the second to-be-processed file.

In an embodiment, when the computer program is run by the processor, the following steps are further performed:

obtaining first information related to displaying of the screen of the terminal;

obtaining second information related to performance of the terminal; and performing distortion processing on the first image file and the second image file based on the first information and/or the second information, to obtain a third image file related to the first image file and a fourth image file related to the second image file, and storing the third image file and the fourth image file in the video RAM to perform file sharing.

The first information includes information of at least one of a screen aspect ratio or a resolution.

The second information includes information of at least one of a model of the terminal or a performance index of a processor of the terminal.

In an embodiment, when the computer program is run by the processor, the following steps are further performed:

receiving an instruction for a recording operation, and when providing the third image file and the fourth image file to the recording thread for recording, encoding and combining the first audio file and the third image file into a first target file based on the file conversion logic, and encoding and combining the second audio file and the fourth image file into a second target file.

In an embodiment, when the computer program is run by the processor, the following steps are further performed:

receiving an instruction for a file sharing operation, and sharing the first target file and the second target file with a target user according to an address of the target user; or sharing the first target file and the second target file on a corresponding web page according to a link address of the web page.

In an embodiment, when the computer program is run by the processor, the following steps are further performed:

storing the first target file and the second target file by using video files of a same format.

On the other hand, when locating on the server side, the computer-readable storage medium includes the following content:

In an embodiment, when the computer program is run by the processor, the following steps are further performed:

generating a file conversion logic based on a player plug-in, a software development kit SDK, and a recording plug-in that are loaded and run in a designated 3D operation environment; and feeding back the file conversion logic to the terminal in response to a download request initiated by a terminal.

In an embodiment, when the computer program is run by the processor, the following steps are further performed:

introducing the SDK into the designated 3D operation environment;

loading and running the player plug-in in the designated 3D operation environment, and performing, by using the player plug-in, audio/video decoding on a first to-be-processed file and a second to-be-processed file obtained based on a source file, to obtain an audio file and an image file that correspond to each of the first to-be-processed file and the second to-be-processed file;

when it learns, through monitoring, that the image file is distorted, performing distortion processing on the image file corresponding to each of the first to-be-processed file and the second to-be-processed file by using the SDK; and before a recording thread is started by using the recording plug-in to perform recording, storing an obtained result of the distortion processing in an image file format to a video RAM to perform file sharing.

In an embodiment, the recording plug-in includes a first plug-in related to the video RAM in the designated 3D operation environment and a second plug-in responding to the recording operation. When the computer program is run by the processor, the following steps are further performed:

the first plug-in communicates with the video RAM, to extract the result of the distortion processing from the video RAM; and the second plug-in communicates with the first plug-in in response to the recording operation, to provide the result of the distortion processing to the recording thread for recording, and the result of the distortion processing and the audio file that corresponds to each of the first to-be-processed file and the second to-be-processed file are encoded and combined, based on the file conversion logic, into a first target file and a second target file that are directly used for virtual reality VR playing.

In the several embodiments provided in this application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments may be integrated into one processing unit, or each of the units may be used as a unit alone, or two or more units are integrated into one unit. The integrated unit may be implemented through hardware, or may also be implemented in a form of hardware plus a software functional unit.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium may be any medium that is capable of storing program code, such as a portable storage device, a ROM, a RAM, a magnetic disk, and an optical disc.

Alternatively, when the integrated unit in the disclosure is implemented with a software functional unit form and sold or used as an independent product, the integrated unit may be stored in a computer readable storage medium. Based on such an understanding, the technical solutions of the embodiments essentially, or the part contributing to the related art technology, or some of the technical solutions may be implemented in a form of a software product. The software product is stored in a storage medium, and includes several instructions for instructing a computer device (which may be a personal computer, a server, a network device, and the like) to perform all or some of the methods described in the embodiments. The foregoing storage medium includes: any medium that can store program code, such as a mobile storage device, a ROM, a RAM, a magnetic disk, or an optical disc.

The foregoing descriptions are merely specific implementations of the disclosure, but are not intended to limit the protection scope of the disclosure. Any variation or replacement readily figured out by persons skilled in the art within the technical scope disclosed in the disclosure shall fall within the protection scope of the disclosure. Therefore, the protection scope of the disclosure shall be subject to the protection scope of the claims.

Industrial Practicability

According to the embodiments, on one hand, a file conversion logic is used as a general processing mechanism, so that a series of operations such as audio/video decoding and distortion processing may be performed. Therefore, any source file and terminal may be adaptive to, and no specified APP needs to be installed on the terminal for processing, and a better distortion processing effect can be achieved. The obtained result of the distortion processing is stored in an image file format to a video RAM for performing file sharing, so that there is no need to perform a plurality of times of copy operations, and a required file only needs to be obtained from sharing during recording, not only improving efficiency, but also preventing excessive occupancy of a CPU and a memory. After an instruction for a recording operation is received, the result of the distortion processing is provided to a recording thread for recording, and finally the result of the distortion processing and the audio file are encoded and combined into a target file that is directly used for VR playing.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

While a few exemplary embodiments have been described above, the scope of the disclosure is not limited thereto and various modifications and improvements made by those of ordinary skill in the art to concepts defined in the following claims should be understood to fall within the scope of the disclosure.

What is claimed is:

1. A file processing method in a terminal comprising at least one processor, the method comprising:
    obtaining, by the at least one processor, a file conversion logic, the file conversion logic being based on a player plug-in, a software development kit (SDK), and a recording plug-in that are loaded and run in a designated three-dimensional (3D) operation environment;
    playing, by the at least one processor, a first to-be-processed file and a second to-be-processed file obtained based on a source file, the first to-be-processed file being a left video file of the source file displayed on a screen of the terminal, and the second to-be-processed file being a right video file of the source file displayed on the screen of the terminal;
    performing, by the at least one processor, audio/video decoding on each of the first to-be-processed file and the second to-be-processed file based on the file conversion logic, to obtain a first audio file and a first image file that correspond to the first to-be-processed file and to obtain a second audio file and a second image file that correspond to the second to-be-processed file;

performing, by the at least one processor, distortion processing on the first image file to provide a first distorted image file corresponding to the left video file and performing distortion processing on the second image file to provide a second distorted image file corresponding to the right video file, and storing a result of the distortion processing in an image file format in a video random access memory (RAM);

providing, by the at least one processor, the first distorted image file and the second distorted image file to a recording thread for recording in response to an instruction for a recording operation;

encoding and combining, based on the file conversion logic, the first distorted image file and the first audio file into a first target file; and encoding and combining, based on the file conversion logic, the second distorted image file and the second audio file into a second target file, the first target file and the second target file respectively corresponding to the left video file and the right video file, and being for virtual reality (VR) playing.

2. The method according to claim 1, wherein the performing the distortion processing comprises:

obtaining first information related to displaying of the screen of the terminal;

obtaining second information related to performance of the terminal; and performing the distortion processing on the first image file and the second image file based on the first information and/or the second information, to obtain a third image file related to the first image file and a fourth image file related to the second image file, and storing the third image file and the fourth image file in the video RAM.

3. The method according to claim 2, wherein the first information comprises information of at least one of a screen aspect ratio and a resolution; and the second information comprises information of at least one of a model of the terminal and a performance index of a processor of the terminal.

4. The method according to claim 2, further comprising:

providing the third image file and the fourth image file to a recording thread for recording in response to an instruction for a recording operation, encoding and combining the first audio file and the third image file into a first target file based on the file conversion logic, and encoding and combining the second audio file and the fourth image file into a second target file based on the file conversion logic, the first target file and the second target file being used for virtual reality (VR) playing.

5. The method according to claim 1, further comprising:

in response to receiving an instruction for a file sharing operation, performing at least one of:

sharing the first target file and the second target file with a target user according to an address of the target user; and sharing the first target file and the second target file on a web page according to a link address of the web page.

6. The method according to claim 1, further comprising: storing the first target file and the second target file by using video files of a same format.

7. A terminal, comprising:

at least one memory operable to store program code; and at least one processor operable to read the program code and operate as instructed by the program code, the program code comprising:

obtaining code configured to cause the at least one processor to obtain a file conversion logic, the file conversion logic being based on a player plug-in, a software development kit (SDK), and a recording plug-in that are loaded and run in a designated three-dimensional (3D) operation environment;

playing code configured to cause the at least one processor to play a first to-be-processed file and a second to-be-processed file obtained based on a source file, the first to-be-processed file being a left video file of the source file displayed on a screen of the terminal, and the second to-be-processed file being a right video file of the source file displayed on the screen of the terminal; and first processing code configured to cause the at least one processor to:

perform audio/video decoding on each of the first to-be-processed file and the second to-be-processed file based on the file conversion logic, to obtain a first audio file and a first image file that correspond to the first to-be-processed file and to obtain a second audio file and a second image file that correspond to the second to-be-processed file, perform distortion processing on the first image file to provide a first distorted image file corresponding to the left video file and perform distortion processing on the second image file to provide a second distorted image file corresponding to the right video file, and store a result of the distortion processing in an image file format in a video random access memory (RAM);

provide the first distorted image file and the second distorted image file to a recording thread for recording in response to an instruction for a recording operation;

encode and combine, based on the file conversion logic, the first distorted image file and the first audio file into a first target file; and encode and combine, based on the file conversion logic, the second distorted image file and the second audio file into a second target file, the first target file and the second target file respectively corresponding to the left video file and the right video file, and being for virtual reality (VR) playing.

8. The terminal according to claim 7, wherein the first processing code further causes the at least one processor to:

obtain first information related to displaying of the screen of the terminal;

obtain second information related to performance of the terminal; and perform the distortion processing on the first image file and the second image file based on the first information and/or the second information, to obtain a third image file related to the first image file and a fourth image file related to the second image file, and store the third image file and the fourth image file in the video RAM.

9. The terminal according to claim 8, wherein the first information comprises information of at least one of a screen aspect ratio and a resolution; and the second information comprises information of at least one of a model of the terminal and a performance index of a processor of the terminal.

10. The terminal according to claim 8, wherein the program code further comprises second processing code configured to cause the at least one processor to:
provide the third image file and the fourth image file to a recording thread for recording in response to an instruction for a recording operation; and
encode and combine the first audio file and the third image file into a first target file based on the file conversion logic, and encode and combine the second audio file and the fourth image file into a second target file based on the file conversion logic, the first target file and the second target file being used for virtual reality (VR) playing.

11. The terminal according to claim 7, further comprising:
sharing code configured to cause the at least one processor to, in response to receiving an instruction for a file sharing operation, perform at least one of:
share the first target file and the second target file with a target user according to an address of the target user; and
share the first target file and the second target file on a web page according to a link address of the web page.

12. The terminal according to claim 7, further comprising:
storage code configured to cause the at least one processor to store the first target file and the second target file by using video files of a same format.

13. A non-transitory computer storage medium storing instructions, which, when executed by at least one processor, cause the at least one processor to perform:
obtaining a file conversion logic, the file conversion logic being based on a player plug-in, a software development kit (SDK), and a recording plug-in that are loaded and run in a designated three-dimensional (3D) operation environment;
playing a first to-be-processed file and a second to-be-processed file obtained based on a source file, the first to-be-processed file being a left video file of the source file displayed on a screen of a terminal, and the second to-be-processed file being a right video file of the source file displayed on the screen of the terminal;
performing audio/video decoding on each of the first to-be-processed file and the second to-be-processed file based on the file conversion logic, to obtain a first audio file and a first image file that correspond to the first to-be-processed file and to obtain a second audio file and a second image file that correspond to the second to-be-processed file;
performing distortion processing on the first image file to provide a first distorted image file corresponding to the left video file and performing distortion processing on the second image file to provide a second distorted image file corresponding to the right video file, and storing a result of the distortion processing in an image file format in a video random access memory (RAM);
providing the first distorted image file and the second distorted image file to a recording thread for recording in response to an instruction for a recording operation;
encoding and combining, based on the file conversion logic, the first distorted image file and the first audio file into a first target file; and
encoding and combining, based on the file conversion logic, the second distorted image file and the second audio file into a second target file, the first target file and the second target file respectively corresponding to the left video file and the right video file, and being for virtual reality (VR) playing.

14. The computer storage medium according to claim 13, wherein the performing the distortion processing comprises:
obtaining first information related to displaying of the screen of the terminal;
obtaining second information related to performance of the terminal; and
performing the distortion processing on the first image file and the second image file based on the first information and/or the second information, to obtain a third image file related to the first image file and a fourth image file related to the second image file, and storing the third image file and the fourth image file in the video RAM.

15. The computer storage medium according to claim 14, wherein the first information comprises information of at least one of a screen aspect ratio and a resolution; and
the second information comprises information of at least one of a model of the terminal and a performance index of a processor of the terminal.

16. The computer storage medium according to claim 14, wherein the instructions further cause the at least one processor to perform:
providing the third image file and the fourth image file to a recording thread for recording in response to an instruction for a recording operation, encoding and combining the first audio file and the third image file into a first target file based on the file conversion logic, and encoding and combining the second audio file and the fourth image file into a second target file based on the file conversion logic, the first target file and the second target file being used for virtual reality (VR) playing.

17. The computer storage medium according to claim 13, further comprising:
in response to receiving an instruction for a file sharing operation, performing at least one of:
sharing the first target file and the second target file with a target user according to an address of the target user; and
sharing the first target file and the second target file on a web page according to a link address of the web page.

* * * * *